(12) United States Patent
Schoonmaker et al.

(10) Patent No.: US 12,358,763 B2
(45) Date of Patent: Jul. 15, 2025

(54) SYSTEM FOR DETERMINING CRANE STATUS USING OPTICAL AND/OR ELECTROMAGNETIC SENSORS

(71) Applicant: Manitowoc Crane Companies, LLC, Milwaukee, WI (US)

(72) Inventors: Stephen J. Schoonmaker, Chambersburg, PA (US); Matthew T. Oswald, Manitowoc, WI (US); Melisa Lavery, Chambersburg, PA (US); Frank C. Schnittker, Wuerzburg (DE); John R. Rudy, Greencastle, PA (US); Jared Yorke, Falling Waters, WV (US)

(73) Assignee: Manitowoc Crane Companies, LLC, Milwaukee, WI (US)

( * ) Notice: Subject to any disclaimer, the term of this patent is extended or adjusted under 35 U.S.C. 154(b) by 699 days.

(21) Appl. No.: 16/676,121

(22) Filed: Nov. 6, 2019

(65) Prior Publication Data

US 2020/0140239 A1    May 7, 2020

Related U.S. Application Data

(60) Provisional application No. 62/756,954, filed on Nov. 7, 2018.

(51) Int. Cl.
*B66C 23/88* (2006.01)
*B66C 13/16* (2006.01)
(Continued)

(52) U.S. Cl.
CPC .............. *B66C 23/88* (2013.01); *B66C 13/16* (2013.01); *G01S 17/08* (2013.01); *G01S 17/89* (2013.01);
(Continued)

(58) Field of Classification Search
CPC ........... B60R 1/00; B66C 13/16; B66C 13/46; B66C 23/42; B66C 23/88;
(Continued)

(56) References Cited

U.S. PATENT DOCUMENTS 4,216,868 A     8/1980  Geppert
4,408,195 A *  10/1983  Tullis .................... B66C 15/065
                                                        340/685

(Continued)

FOREIGN PATENT DOCUMENTS

AU              637377 B      10/1993
AU         2015372216 A1       7/2016
(Continued)

OTHER PUBLICATIONS

"Understand Overhead Crane Deflection and Criteria." https://www.spanco.com/blog/understanding-overhead-crane-deflection-and-criteria/. Dec. 2014 (Year: 2014).*

(Continued)

*Primary Examiner* — Farzana Hossain
(74) *Attorney, Agent, or Firm* — Cook Alex Ltd.

(57) ABSTRACT

A crane includes a lower works having one or more ground engaging elements, an upper works connected to the lower works, the upper works having a boom, and a system for determining a crane status. The system includes a sensor assembly positioned to have a line of sight along at least a portion of a length of the boom or the lower works. The sensor assembly configured to detect light transmission and output sensor information. The system further includes a computer configured to receive the sensor information and determine the crane status based on the sensor information. A method of determining the crane status is also provided.

13 Claims, 17 Drawing Sheets

(51) Int. Cl.
  *B66C 23/42* (2006.01)
  *G01S 17/08* (2006.01)
  *G01S 17/89* (2020.01)
  *G06T 7/521* (2017.01)
  *G06T 7/62* (2017.01)
  *G06T 7/70* (2017.01)
  *G06T 7/90* (2017.01)
  *H04N 23/54* (2023.01)

(52) U.S. Cl.
  CPC ............... *G06T 7/521* (2017.01); *G06T 7/62* (2017.01); *G06T 7/70* (2017.01); *G06T 7/90* (2017.01); *H04N 23/54* (2023.01); *B66C 23/42* (2013.01); *B66C 2700/0357* (2013.01); *G06T 2207/10028* (2013.01)

(58) Field of Classification Search
  CPC ............ B66C 2700/0357; G01S 17/06; G01S 17/08; G01S 17/88; G01S 17/89; G01S 7/4817; G01S 7/4972; G01B 11/03; G06T 2207/10028; G06T 7/521; G06T 7/62; G06T 7/70; G06T 7/90; G06V 20/00; H04N 23/54
  See application file for complete search history.

(56) References Cited

U.S. PATENT DOCUMENTS

| | | |
|---|---|---|
| 4,577,344 A | 3/1986 | Warren et al. |
| 4,826,391 A | 5/1989 | Lawrence et al. |
| 4,907,768 A | 3/1990 | Masseron et al. |
| 5,251,768 A | 10/1993 | Yoshimatsu et al. |
| 5,392,935 A | 2/1995 | Kazama et al. |
| 5,642,822 A | 7/1997 | Monzen et al. |
| 5,645,181 A | 7/1997 | Ichiba et al. |
| 5,726,907 A | 5/1998 | Davidson et al. |
| 5,967,347 A | 10/1999 | Miyata et al. |
| 6,065,619 A | 5/2000 | Miyata et al. |
| 6,140,930 A | 10/2000 | Shaw |
| 6,170,681 B1 | 1/2001 | Yoshimatsu |
| 6,182,843 B1 | 2/2001 | Tax et al. |
| 6,256,553 B1 | 7/2001 | Erikkila |
| 6,554,144 B2 | 4/2003 | Hashiguchi et al. |
| 6,568,547 B1 | 5/2003 | Kretschmer et al. |
| 6,588,610 B2 | 7/2003 | Ong et al. |
| 6,634,112 B2 | 10/2003 | Carr et al. |
| 6,718,048 B1 | 4/2004 | Kawata et al. |
| 6,735,486 B2 | 5/2004 | Hoffelmeyer et al. |
| 6,748,104 B1 | 6/2004 | Bachelder et al. |
| 6,765,224 B1 | 7/2004 | Favreau et al. |
| 6,871,710 B1 | 3/2005 | Darling et al. |
| 6,894,621 B2 | 5/2005 | Shaw |
| 6,945,336 B1 | 9/2005 | Darling et al. |
| 7,106,883 B2 | 9/2006 | Uchida et al. |
| 7,121,012 B2 | 10/2006 | Voecks |
| 7,289,875 B2 | 10/2007 | Recktenwald et al. |
| 7,289,876 B2 | 10/2007 | Lussen et al. |
| 7,310,431 B2 | 12/2007 | Gokturk et al. |
| 7,472,009 B2 | 12/2008 | Baldwin |
| 7,599,762 B2 | 10/2009 | Discenzo et al. |
| 7,648,036 B2 | 1/2010 | Recktenwald et al. |
| 7,656,459 B2 | 2/2010 | Catanzaro |
| 7,936,143 B2 | 5/2011 | Ikeguchi et al. |
| 7,950,539 B2 | 5/2011 | Henriksson |
| 8,005,598 B2 | 8/2011 | Terashima et al. |
| 8,025,167 B2 | 9/2011 | Schneider et al. |
| 8,267,264 B2 | 9/2012 | Bryfors et al. |
| 8,272,521 B1 | 9/2012 | Kemmerly et al. |
| 8,385,594 B2 | 2/2013 | Hofmann et al. |
| 8,504,253 B2 | 8/2013 | Stantchev et al. |
| 8,618,949 B2 | 12/2013 | Maynard et al. |
| 8,659,408 B2 | 2/2014 | Taylor et al. |
| 8,682,541 B2 | 3/2014 | Best et al. |
| 8,937,651 B2 | 1/2015 | Guissin et al. |
| 9,156,663 B2 | 10/2015 | Roeben et al. |
| 9,278,834 B2 | 3/2016 | Pech et al. |
| 9,300,954 B2 | 3/2016 | Tanizumi et al. |
| 9,335,318 B2 | 5/2016 | Ilaka et al. |
| 9,394,146 B2 | 7/2016 | Schroder |
| 9,440,824 B2 | 9/2016 | Stuehrwoldt et al. |
| 9,556,006 B2 | 1/2017 | Schneider et al. |
| 2003/0136901 A1* | 7/2003 | Ohtomo ............... G01C 15/004 250/234 |
| 2003/0137590 A1 | 7/2003 | Barnes et al. |
| 2003/0161524 A1 | 8/2003 | King |
| 2004/0174542 A1* | 9/2004 | Handman ............... G01B 11/16 356/622 |
| 2005/0192732 A1 | 9/2005 | Narisawa et al. |
| 2005/0226584 A1 | 10/2005 | Williams et al. |
| 2005/0232626 A1 | 10/2005 | Schulte et al. |
| 2010/0070179 A1 | 3/2010 | Cameron |
| 2010/0189226 A1 | 7/2010 | Kotowski et al. |
| 2010/0277298 A1 | 11/2010 | Leong et al. |
| 2011/0031202 A1 | 2/2011 | Pech et al. |
| 2011/0140419 A1 | 6/2011 | Stockner |
| 2011/0187548 A1 | 8/2011 | Maynard et al. |
| 2011/0272376 A1 | 11/2011 | Jung et al. |
| 2013/0013251 A1 | 1/2013 | Schoonmaker et al. |
| 2013/0119256 A1 | 5/2013 | Husmann et al. |
| 2013/0345857 A1 | 12/2013 | Lee et al. |
| 2014/0224755 A1 | 8/2014 | Eriksson et al. |
| 2015/0122761 A1 | 5/2015 | Ford et al. |
| 2015/0130375 A1 | 5/2015 | Sutherland |
| 2015/0142277 A1 | 5/2015 | Eriksson et al. |
| 2015/0217455 A1 | 8/2015 | Kikkeri et al. |
| 2015/0226369 A1 | 8/2015 | Troy et al. |
| 2015/0256797 A1 | 9/2015 | Torben |
| 2015/0329333 A1 | 11/2015 | Fenker |
| 2015/0344271 A1 | 12/2015 | Schneider et al. |
| 2016/0006947 A1 | 1/2016 | Kowatari et al. |
| 2016/0016763 A1 | 1/2016 | Lee et al. |
| 2016/0031681 A1 | 2/2016 | Delplace |
| 2016/0031683 A1 | 2/2016 | Fenker et al. |
| 2016/0035251 A1 | 2/2016 | Delplace |
| 2016/0107866 A1* | 4/2016 | Schoonmaker ......... B66C 13/46 701/50 |
| 2016/0119589 A1 | 4/2016 | Tanizumi et al. |
| 2016/0176686 A1 | 6/2016 | Schoonmaker |
| 2016/0236913 A1 | 8/2016 | Ilaka et al. |
| 2017/0217737 A1* | 8/2017 | Rudy ................... G06T 7/0004 |
| 2018/0044149 A1 | 2/2018 | Weckbecker et al. |
| 2018/0072540 A1 | 3/2018 | Stangl |
| 2018/0141787 A1 | 5/2018 | Rudy et al. |
| 2018/0141788 A1 | 5/2018 | Rudy et al. |
| 2018/0141789 A1 | 5/2018 | Rudy et al. |
| 2018/0143011 A1* | 5/2018 | Rudy ..................... B66C 13/16 |
| 2018/0209156 A1 | 7/2018 | Pettersson |
| 2018/0252921 A1 | 9/2018 | Rantala et al. |
| 2019/0112165 A1 | 4/2019 | Palberg et al. |
| 2019/0270624 A1 | 9/2019 | Sembo |
| 2019/0276281 A1 | 9/2019 | Hofmeister et al. |
| 2020/0062555 A1* | 2/2020 | Appling, Jr. ............ B66C 13/40 |
| 2020/0340208 A1* | 10/2020 | Kitajima ................ B66C 13/18 |

FOREIGN PATENT DOCUMENTS

| | | |
|---|---|---|
| CN | 2154484 Y | 1/1994 |
| CN | 101830397 A | 9/2010 |
| CN | 102193559 A | 9/2011 |
| CN | 102661952 A | 9/2012 |
| CN | 102795547 A | 11/2012 |
| CN | 103350956 A | 10/2013 |
| CN | 103398668 A | 11/2013 |
| CN | 203319435 U | 12/2013 |
| CN | 102756976 B | 7/2014 |
| CN | 104477723 A | 4/2015 |
| CN | 104535356 A | 4/2015 |
| CN | 105217477 A | 1/2016 |
| CN | 105668419 A | 6/2016 |
| DE | 102006046469 A1 | 4/2008 |
| DE | 102013008348 A1 | 11/2014 |
| DE | 102014018063 A1 | 6/2016 |
| EP | 2383566 A1 | 11/2011 |

(56) References Cited

FOREIGN PATENT DOCUMENTS

| | | | |
|---|---|---|---|
| EP | 2722302 A1 | 4/2014 | |
| EP | 2914540 B1 | 9/2015 | |
| EP | 2899496 A1 | 8/2016 | |
| JP | 2056397 A | 2/1990 | |
| JP | H0256397 A | 2/1990 | |
| JP | H07117974 A | 5/1995 | |
| JP | H08157188 A | 6/1996 | |
| JP | 2003300692 A | 10/2003 | |
| JP | 2008074594 A | 4/2008 | |
| JP | 2009073248 A | 4/2009 | |
| JP | 2010241548 A | 10/2010 | |
| JP | 2013120176 A | 6/2013 | |
| JP | 2013193825 A | 9/2013 | |
| JP | 2015101470 A | 6/2015 | |
| JP | 2015229582 A | 12/2015 | |
| JP | 2016166086 A | 9/2016 | |
| JP | 2016166091 A | 9/2016 | |
| JP | 2017186163 A | 10/2017 | |
| JP | 2017186164 A | 10/2017 | |
| JP | 2017186165 A | 10/2017 | |
| WO | 9119665 A1 | 2/1991 | |
| WO | 1999008956 A1 | 2/1999 | |
| WO | 2004080882 A1 | 9/2004 | |
| WO | 2009047719 A2 | 4/2009 | |
| WO | 2013059599 A1 | 4/2013 | |
| WO | 2014019132 A1 | 2/2014 | |
| WO | 2014047840 A1 | 4/2014 | |
| WO | 2015154508 A1 | 10/2015 | |
| WO | 2016101500 A1 | 6/2016 | |
| WO | 2017067651 A1 | 4/2017 | |
| WO | 2017159321 A1 | 9/2017 | |
| WO | 2018160119 A1 | 9/2018 | |

OTHER PUBLICATIONS

Vallan A, Molinari F. A vision-based technique for lay length measurement of metallic wire ropes. IEEE Trans Instrum Meas 2009; 58. (Year: 2009).
European Search Report issued by ISA/EPO in connection with EP17153446 on Jul. 7, 2017.
"360 degree vehicle camera systems", https://www.vdo-instruments.com/camera-systems/360-degree-vehicle-camera-systems.html, captured Oct. 9, 2017.
"ProViu ASL 360", http://www.asl360.co.uk/products/, captured Oct. 9, 2017.
Extended European Search Report issued by EPO in connection with EP17203098 on Apr. 17, 2018.
Extended European Search Report issued by EPO in connection with EP17203102 Apr. 18, 2018.
Extended European Search Report issued by EPO in connection with EP17203093 on Apr. 18, 2018.
Extended European Search Report issued by EPO in connection with EP17203109 on May 4, 2018.
Extended European Search Report issued by EPO in connection with corresponding EP Appl. 19207783.2 on Mar. 31, 2020.
First Chinese Office Action for Application No. 201911080542.3, dated Sep. 18, 2023.

* cited by examiner

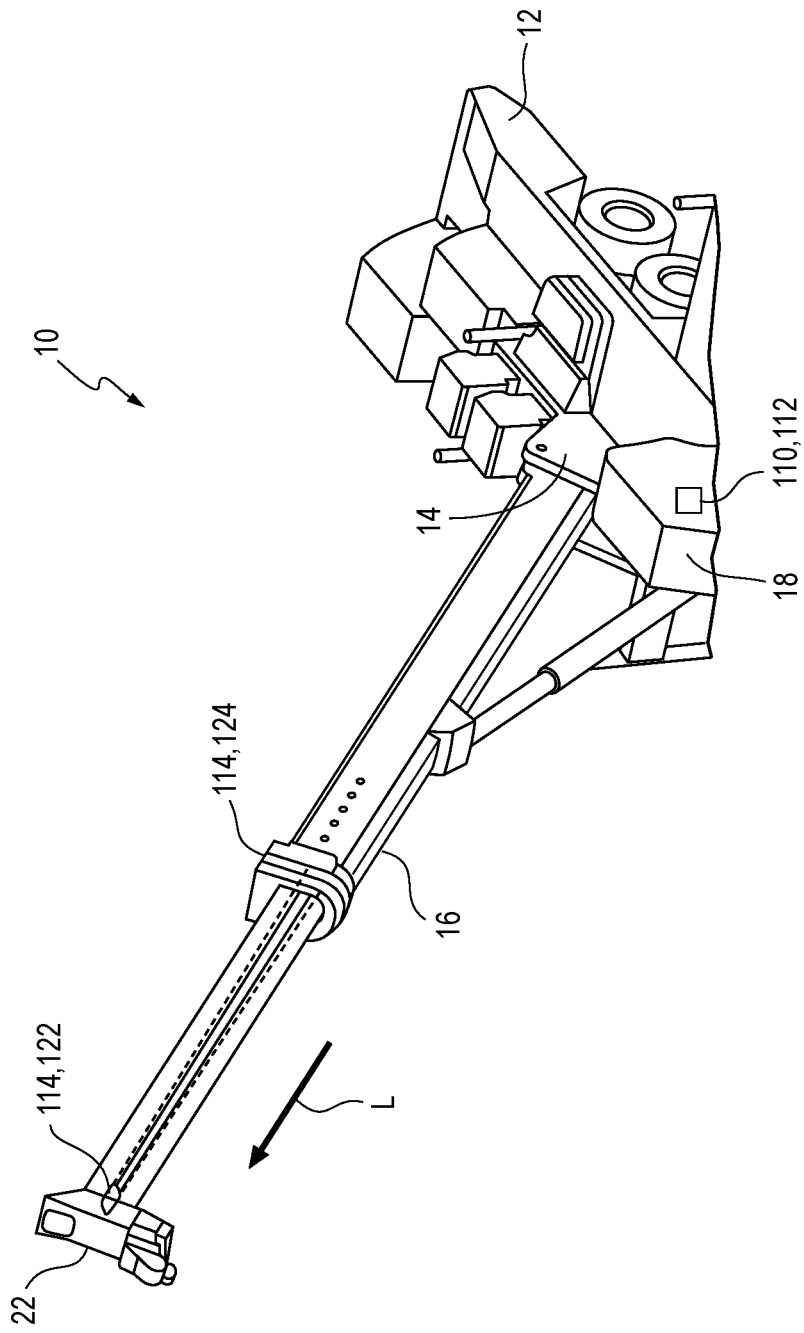

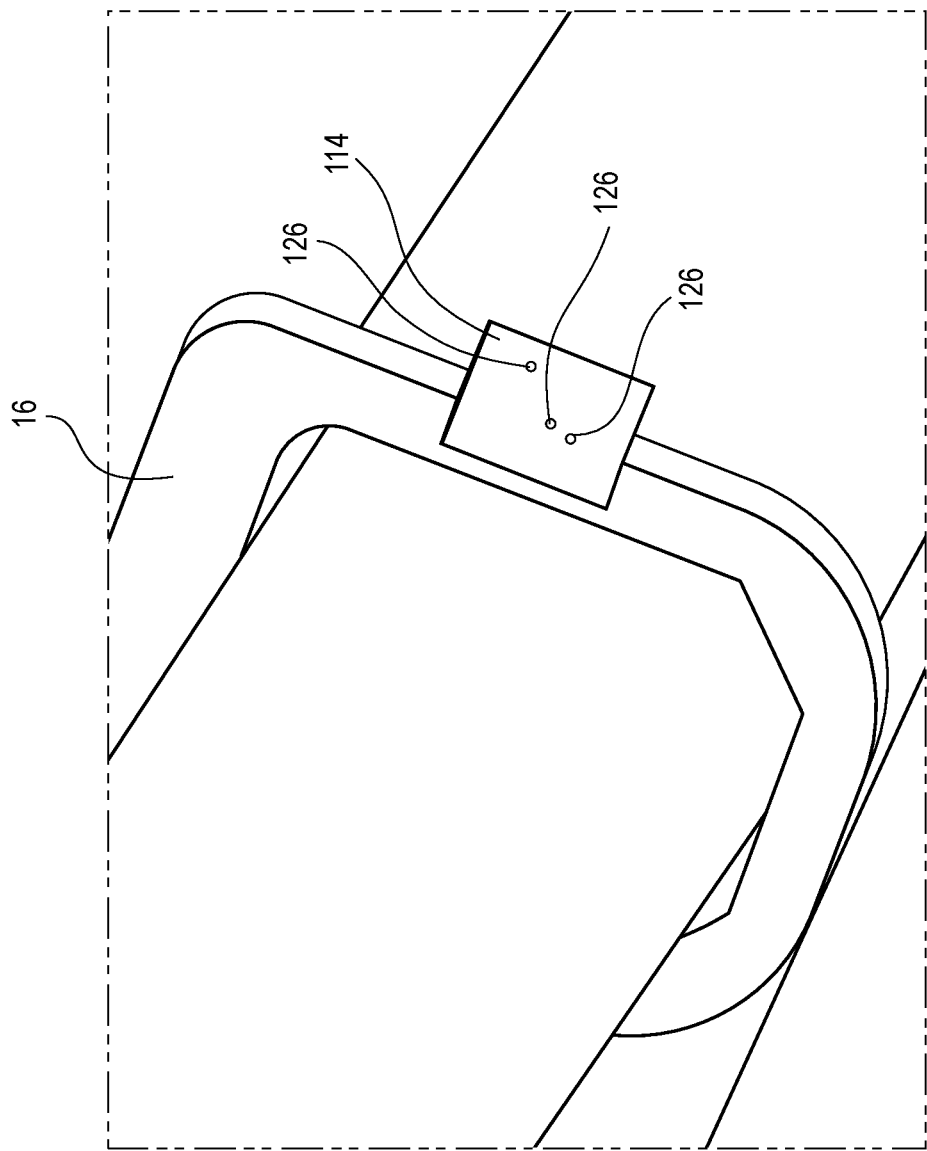

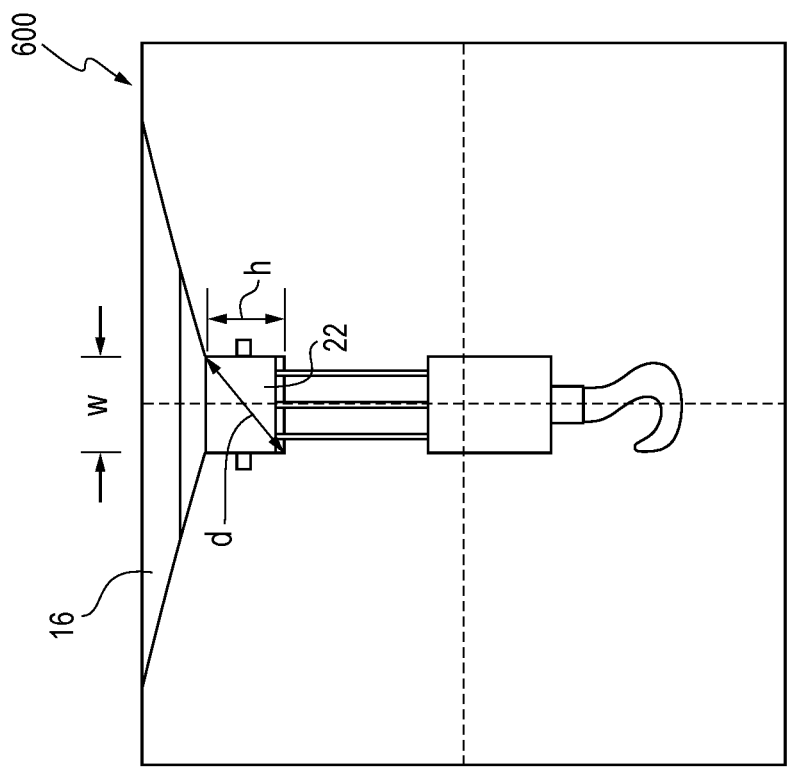
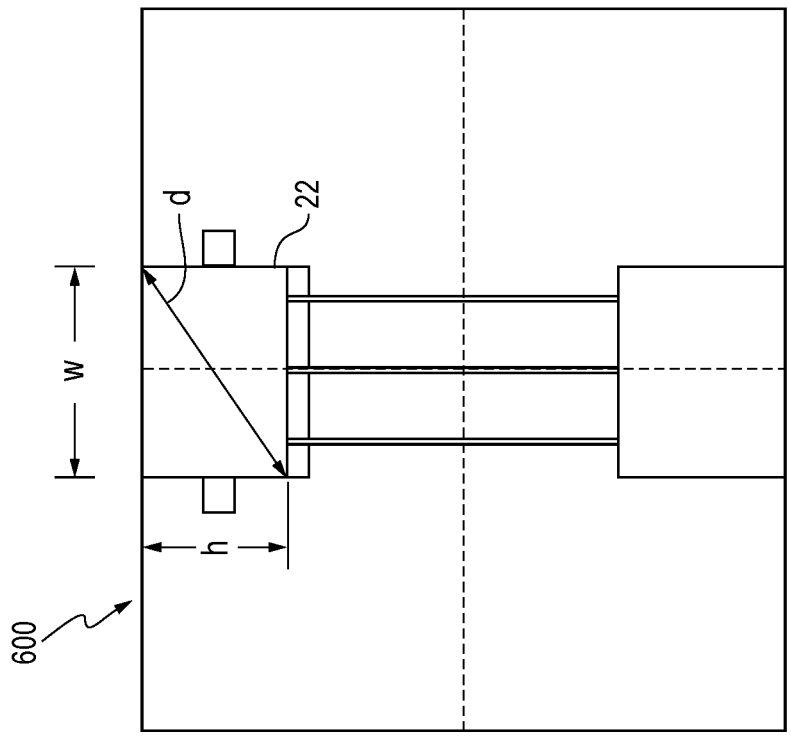

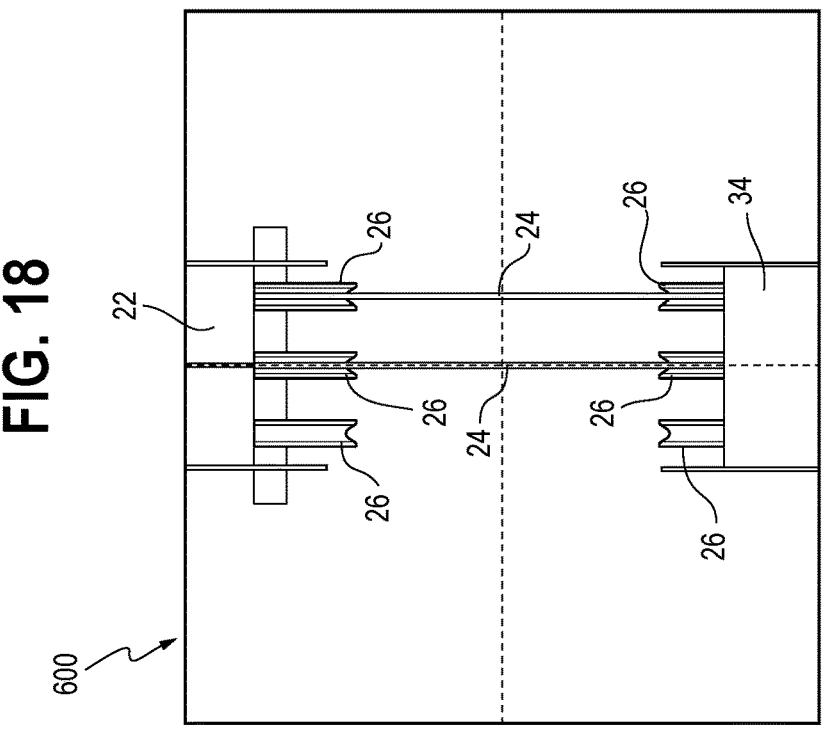
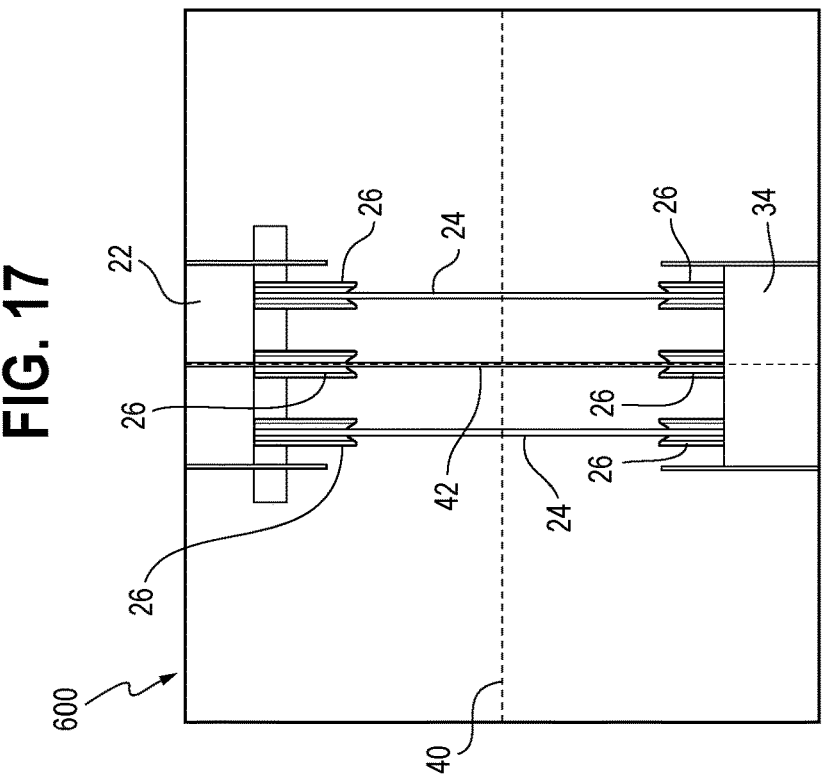

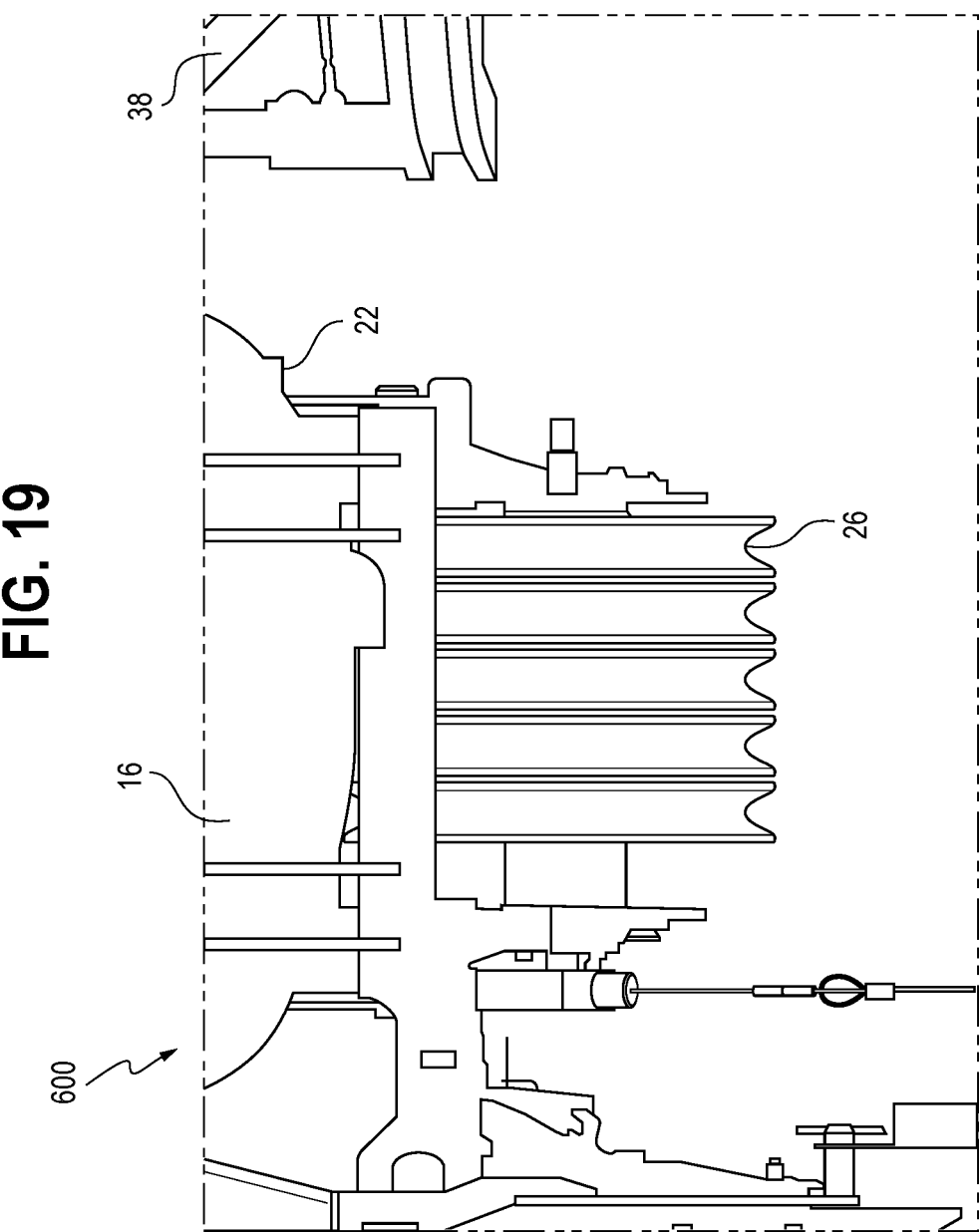

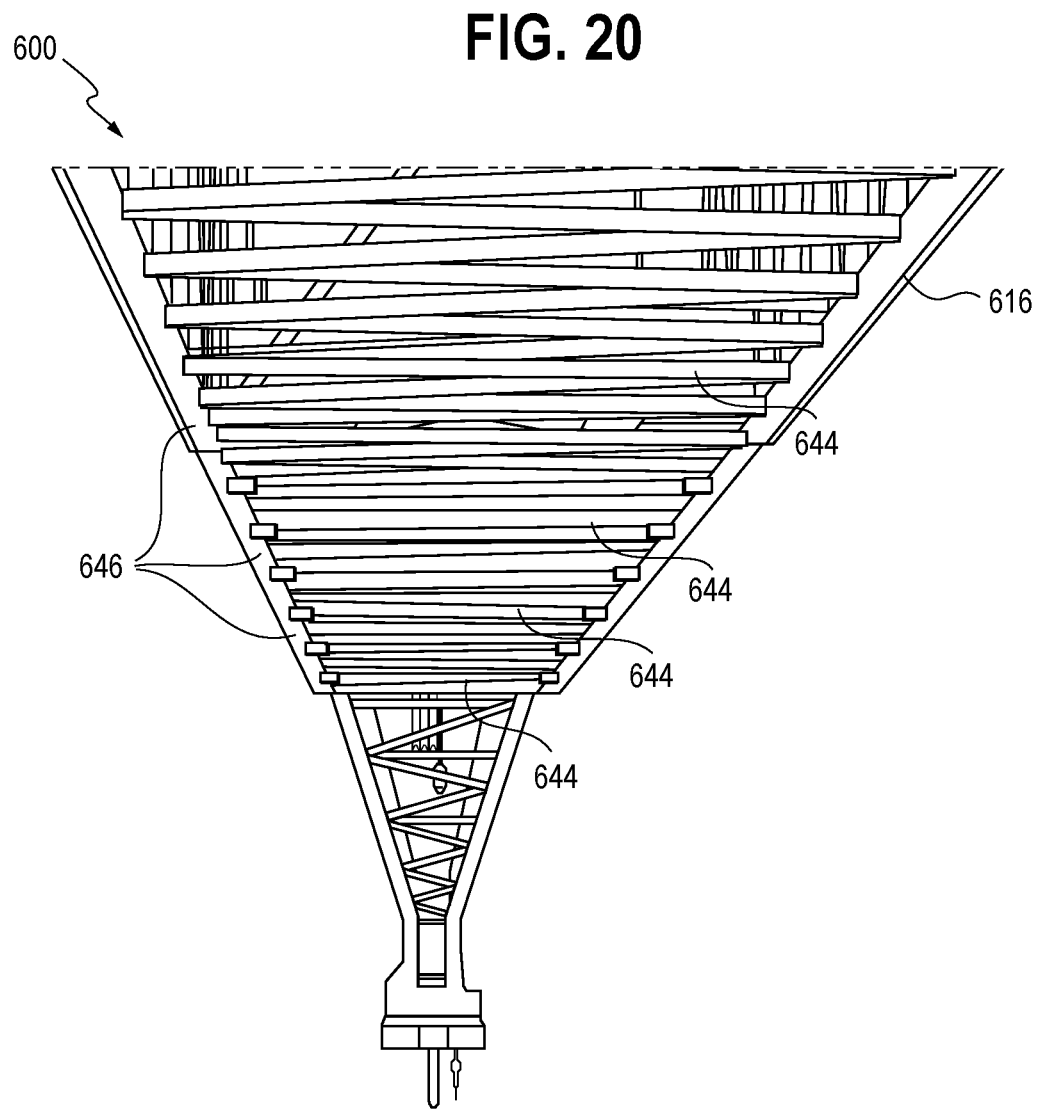

SYSTEM FOR DETERMINING CRANE STATUS USING OPTICAL AND/OR ELECTROMAGNETIC SENSORS

BACKGROUND

The following description relates to a system for determining a crane status, and in particular, a system for determining a crane status using optical and/or electromagnetic sensors.

Known cranes include a boom operably connected to a lower works. For example, a mobile crane may include a telescoping boom connected to a mobile carrier, a crawler crane may include a lattice boom connected to a crawler carrier, and a tower crane may include a boom, commonly referred to as a jib, connected to a tower (also referred to as mast). The known cranes also include one or more hoists configured to wind and unwind a rope suspended from the boom. The rope typically extends around one or more sheaves in a desired reeving. A lifting appliance, such as a hook block, is secured to a free end of the rope. The hook block is configured to engage an object to be lifted by the crane.

The known cranes can perform various movements. For example, a boom may be configured for slewing movement (i.e., swing-left and swing-right), lifting movement (i.e., boom-tip up and boom-tip down), jibbing movement (boom-entirety up and boom-entirety down) and telescoping movement (i.e., tele-sections in and tele-sections out), or combinations thereof. The lifting appliance is configured for vertical movement relative to the boom in response to winding and unwinding of the one or more ropes connected to the hoists. In some cranes, such as a tower crane, the lifting appliance is configured for movement along the boom, for example, by way of a trolley movable along the tower crane boom (sometimes referred to as a jib).

It is desirable to monitor a status of the crane, including conditions of various crane components. Currently, a condition of the crane component may be monitored by processing information received from a plurality of sensors, including proximity sensors, load cells, RFID sensors and the like. Conditions which may be monitored include slew angle, lift angle of the boom (including a luffing jib of a tower crane), boom length, unwound rope length, distance between the lifting appliance and a free end of the boom (boom tip) or tower crane trolley.

Other known systems use optical object recognition techniques to determine and monitor a condition of various crane components. For example, US Pat. Appl. Pubs. Nos. 2017/0217737, 2018/0141787, 2018/0141788, 2018/0141789 and 2018/0143011 disclose various systems in which objects may detected in captured images, and a condition or status of a crane component may be determined based on an analysis of the detected object. For example, in US Pat. Appl. Pub. No. 2018/0143011, a detected object may be a crane carrier or superstructure, and a slew angle or lift angle of the boom may be determined based on an analysis of the detected object.

However, in the systems above, a number and type of crane statuses which may be determined may be limited by physical limitations, e.g., visibility from either end of a boom or from a remotely installed base crane or tower crane base structure.

Another known crane having a sensor unit for detecting a deformation of a jib system transversely to a load plane is disclosed in US Pat. Appl. Pub. No. 2018/0044149 ("US '149"), incorporated herein by reference. However, the sensor unit in US '149 detects movement of the jib system to a predetermined position to activate an adjustment unit for influencing deformation of the jib system. That is, the sensor unit in US '149 does not measure deformations of the jib system through a range of deformations.

Accordingly, it is desirable to provide a system for determining a variety of crane statuses based on reference points related to physical measurement or captured images taken along a length of an elongated crane component, such as a boom or tower.

SUMMARY

According to one aspect, a crane includes a lower works having one or more ground engaging elements, an upper works connected to the lower works, the upper works having a boom, and a system for determining an in situ-crane status. The system includes a sensor assembly positioned to have a line of sight along at least a portion of a length of the boom or the lower works, the sensor assembly configured to detect electromagnetic radiation, e.g., light transmission, and output sensor information relating to the same. The system also includes a computer configured to receive the sensor information and determine the crane status based on the sensor information. The determined crane status includes at least one of: vertical boom deflection, side boom deflection, boom length, boom section length, number of boom sections, type of boom sections, boom attachment installation condition and position, boom attachment length, boom attachment offset, anti-two-block (ATB) component status, ATB status of the crane, reeving configuration, optimal reeving configuration, retaining pin installation status, sheave rotation, boom pick point, flexible member condition, pendant rope length, correct positioning of crane components, number of falls, number of flexible members, differences in construction from desired or expected construction, trolley position, tower crane mast twist, boom twist, sway, trailing boom monitoring, jib rigging mode, and flexible member speed.

In one embodiment, the sensor assembly may include a transmitter configured to emit a laser beam and a receiver having an array of photosensors configured to detect the laser beam. The sensor information may include information regarding detection of the laser beam by a photosensor of the array of photosensors. The sensor information may include information regarding the photosensor detecting the laser beam. The computer may determine a position of the laser beam on the receiver. The determined crane status may be at least one of: side boom deflection and vertical boom deflection. In one embodiment, the transmitter may emit a plurality of laser beams substantially in a vertical or horizontal plane, as desired. In one embodiment, the transmitter may further include a diffraction device, such as one or more prisms, configured to diffract the laser beam into one or more beams in a vertical or horizontal plane, as desired. In one embodiment, the transmitter may be rotatably mounted on the boom for movement through a range of angles in a vertical plane or horizontal plane, as desired. In one embodiment, an angular position of the transmitter may be varied by a motor. Further, in one embodiment, a position of the diffraction device may be adjusted, for example, by a motor. In one embodiment, the diffraction device may be rotated and/or linearly moved.

In one embodiment, the sensor assembly is an image capture device and the computer may be configured to generate a captured image representing the field of view of the image capture device based on the sensor information. The system may be configured to detect one or more objects in the captured image. The one or more detected objects may include at least one of: a crane component, a marker on a crane component, and a horizon. The crane component may include at least one of: the boom, a boom tip, a sheave, a flexible member, a lifting appliance, an ATB component, a boom attachment, a mast, a boom section, a lattice boom chord, a trailing boom dolly, a stop block, a support pendant, and a trolley.

The system may be configured to analyze the captured image to determine one or more parameters within the captured image. The one or more parameters within the captured image may include at least one of: a position, a relative position, a change in position, a distance from a reference point, an orientation, a direction of extension, a size, a shape, dimension, a color and a pattern, of the detected object. The system may be configured to analyze the one or more determined parameters within the captured image to determine at least one of: an actual parameter, an identity of a detected component and a crane status.

In one embodiment, the system may be configured to analyze the captured image to determine at least one of: an actual parameter, an identity of a detected component and a crane status. In one embodiment, the image capture device may be a digital camera. In one embodiment, the image capture device may be a LiDAR assembly. The sensor information may include information regarding a distance of an object in the field of view from the LiDAR assembly.

In one embodiment, the sensor assembly may be positioned on a lateral side of the boom, an underside of the boom, a top side of the boom, on the lower works and positioned to have a field of view along the underside of the boom or on a tower crane mast. In one embodiment, the system for determining the crane status may be operably connected to one or more crane components, and operation of the one or more crane components may be controlled based on the determined crane status.

In one embodiment, the system for determining the crane status may further include a display device. The captured image may be displayed on the display device.

According to another aspect, a method for determining an in situ crane status includes capturing an image along a length of an elongated crane component, detecting one or more objects in the captured image, analyzing the one or more detected objects to determine one or more parameters within the captured image, and analyzing the captured image based on the determined parameters within the captured image to determine one or more of: actual parameters corresponding to parameters determined in the captured image and an identity of the detected object. The method may further include determining the crane status based on the analysis of the determined parameters.

Other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

FIG. 1 is a perspective view of a crane having a system for determining a crane status, according to an embodiment;
FIG. 4 is a perspective view of the receiver of FIG. 2 on the crane, according to an embodiment;
FIG. 13 is a diagram representing an image in which the boom is extended, according to an embodiment;
FIG. 14 is a diagram representing an image in which the boom is retracted, according to an embodiment;
FIG. 17 is a diagram representing an image in which a correct reeving is provided, according to an embodiment;
FIG. 18 is a diagram representing an image in which an incorrect reeving is provided, according to an embodiment;
FIG. 19 is a diagram representing an image in which boom attachments are shown adjacent to the boom, according to an embodiment;
FIG. 20 is a diagram representing an image in which a lattice boom is provided, according to an embodiment.

DETAILED DESCRIPTION

Figure 3:
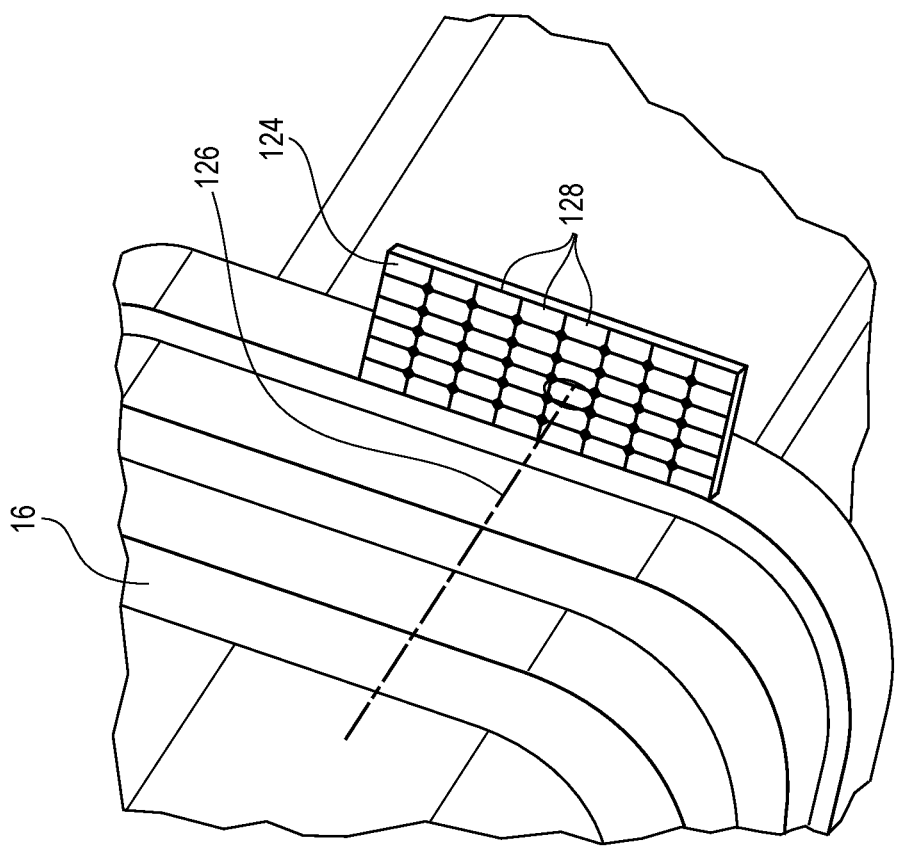
FIG. 3 is a plan view of a photosensor array of the receiver of FIG. 2, according to an embodiment.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

FIG. 1 is a perspective view of a crane 10 having a system 110 for determining a crane status, according to an embodiment. The crane 10 includes lower works 12 and upper works 14 mounted on the lower works 12. The upper works 14 includes a rotating bed (not shown) mounted to the lower works 12 and a boom 16 mounted to the rotating bed so that the boom 16 may rotate with the rotating bed relative to the lower works. An operator's cab 18 may also be mounted on the rotating bed.

Figure 24:
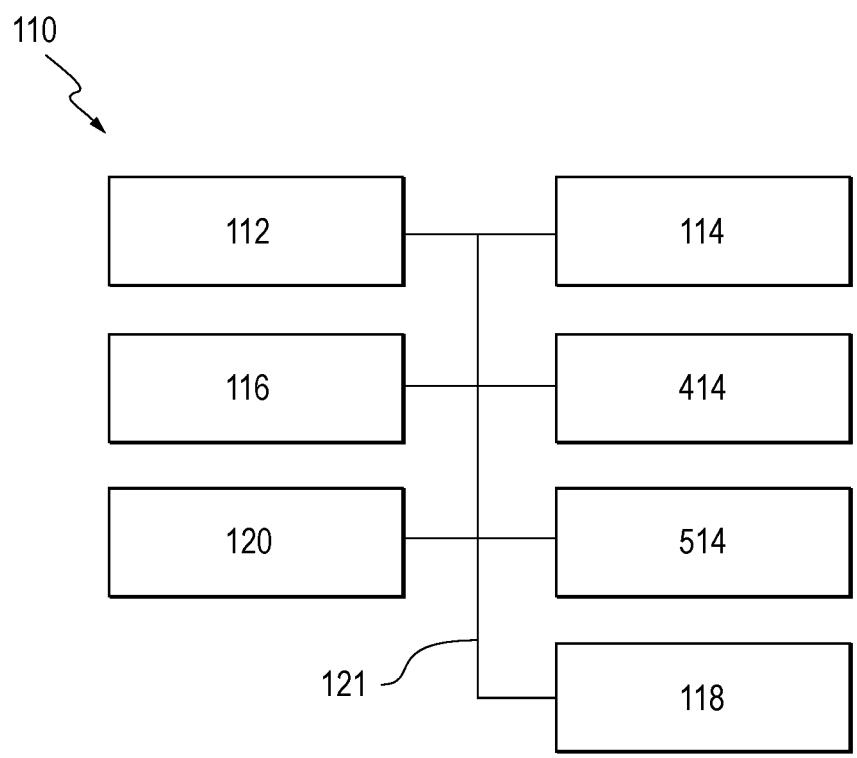
FIG. 24 is a block diagram showing a system for determining a crane status, according to an embodiment.

FIG. 24 is a block diagram showing an example of the system 110 for determining a crane status. The system 110 may include a computer 112 and one or more sensor assemblies 114. 414, 514 operably connected to the computer 112. The computer 112 may be mounted, for example, in the operator's cab 18, as shown schematically in FIG. 1, but is not limited thereto. For example, the computer 112 may comprise a plurality of components operably and/or communicatively connected one another distributed at different locations on the crane 10, positioned remote from the crane 10, or combinations thereof. The computer 112 includes a memory configured to store program instructions and a processor, such as a microprocessor, configured to execute the program instructions to control operations of the computer 112. The memory may be a single unit or may include a plurality of units operably connected, for example, to the processor. Similarly, the computer 112 may include multiple computers operably connected to one another.

The system 110 may further include, for example, a communication device 116 configured to allow communications between the various components of the system 110 and/or external components, for example, over a communication network. The system 110 may also include a visual display device 118. An input/output (I/O) device 120 may also be provided, with which an operator may input information to the system 110 and/or the system 110 may output information. In one embodiment, the I/O device 120 may be integrated with the visual display device 118, for example, as a touch screen display. Various components of the system 110, not limited to those described above, may be operably connected to one another on a bus 121.

The one or more sensor assemblies 114, 414, 514 are operably connected to the computer 112 such that information detected by the one or more sensor assemblies 114, 414, 514 may be received by the computer 112 and processed by the processor according to the stored program instructions. In one embodiment, the one or more sensor assemblies 114, 414, 514 are positioned to have a line sight along at least a portion of the boom 16.

Figure 2:
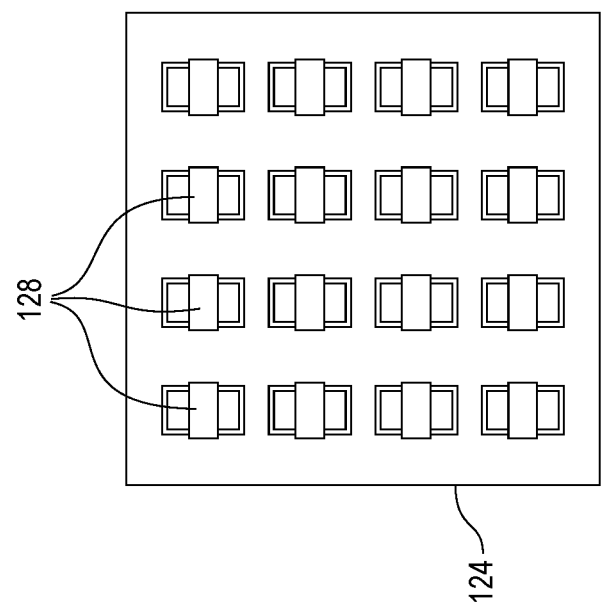
FIG. 2 is an enlarged perspective view showing a sensor assembly receiver connected to a boom of the crane of FIG. 1, according to an embodiment.

Referring again to FIGS. 1 and 2, in one embodiment, a sensor assembly 114 may include a transmitter 122 and a receiver 124. In one embodiment, the transmitter 122 is configured to emit electromagnetic radiation. For example, the transmitter 122 may include a laser configured to emit at least one laser beam 126.

The receiver 124 may be configured to detect the laser beam 126 incident on a surface thereof. In one embodiment, the receiver 124 may be formed generally as a plate and include an array of photosensors 128, such as photodiodes, light dependent resistors, and the like. In one embodiment, a position of individual photosensors 128 may be known and stored, for example, in the memory. FIG. 3 is a plan view showing an arrangement of the photosensors 128 according to an embodiment.

In one embodiment, the transmitter 122 and the receiver 124 may be spaced apart along a length direction 'L' of the boom 16. In one embodiment, the transmitter 122 and the receiver 124 may be positioned on a lateral side surface of the boom 16. In one embodiment, the boom 16 may be a telescoping boom, but is not limited thereto. In one embodiment, the transmitter 122 may be positioned at or near a boom tip 22 and the receiver 124 may be positioned on a different telescoping section of the boom 16.

The system 110 is configured to determine at least one crane status based on sensor information received from the sensor assembly 114. The determined crane status may be, for example, side boom deflection (also referred to as horizontal boom deflection) and/or, in some embodiments, vertical boom deflection. In one embodiment, the system 110 may determine whether such a crane status is present, and/or a measurement or estimate of the extent of the crane status.

For example, in one embodiment, with the boom 16 in an undeflected condition (both side and vertically), the laser beam 126 may be incident on a surface of the receiver 124 at an initial position and detected by a photosensor 128. As the boom 16 deflects either horizontally or vertically, the position of the laser beam 126 on the receiver 124 changes. For example, the laser beam 126 may move horizontally (i.e., in a transverse, or width direction of the boom) as the boom 16 deflects horizontally. Similarly, the laser beam 126 may move vertically (i.e., in a height direction of the boom) as the boom 16 deflects vertically. In some embodiments, if the boom deflects either horizontally or vertically beyond a threshold extent, the laser beam 126 moves to a position where it is offset from, i.e., not incident upon, the receiver 124. To this end, in one embodiment, the receiver 124 may be dimensioned to correspond to such threshold deflections.

Accordingly, in one embodiment, the sensor information may indicate whether the laser beam 126 is incident upon the receiver, and optionally, which photosensor 128 detected the laser beam 126. With a position of the photosensors 128 stored in the memory, the system 110 may determine a position of the laser beam 126 on the receiver 124. The system 110 may determine whether side boom deflection is occurring based on a change in position of the laser beam 126 on the receiver 124. In one embodiment, a scale factor may be known, for example, through calibration, and stored in the memory. The system 110 may then calculate the extent of the side deflection based on the detected change in position of the laser beam 126 on the receiver 124 and the scale factor.

In one embodiment, as noted above, the laser beam 126 moves to a position offset from the receiver 124 if side deflection of the boom 16 exceeds a threshold amount. Thus, the laser beam 126 is not detected on the surface of the receiver 124 in such a condition. In one embodiment, the sensor assembly 114 may provide sensor information indicating that the laser beam 126 is not detected. In another embodiment, the sensor assembly 114 may not provide sensor information, and the system 110 may determine that side boom deflection exceeds the threshold extent in response to not receiving sensor information, for example, over a predetermined length of time.

In another embodiment, the sensor assembly 114 may be configured, such that the laser beam 126, with the boom 16 in an undeflected condition, is not incident upon the receiver 124, but becomes incident upon the receiver 124 in response to boom deflection beyond a threshold extent.

Referring to FIG. 4, in one embodiment, multiple laser beams 126 may be incident upon the receiver 124 and may be detected by one or more photosensors 128. The different laser beams 126 may be emitted from transmitters 122 positioned at different lengths along the boom 16, for example.

Figure 5:
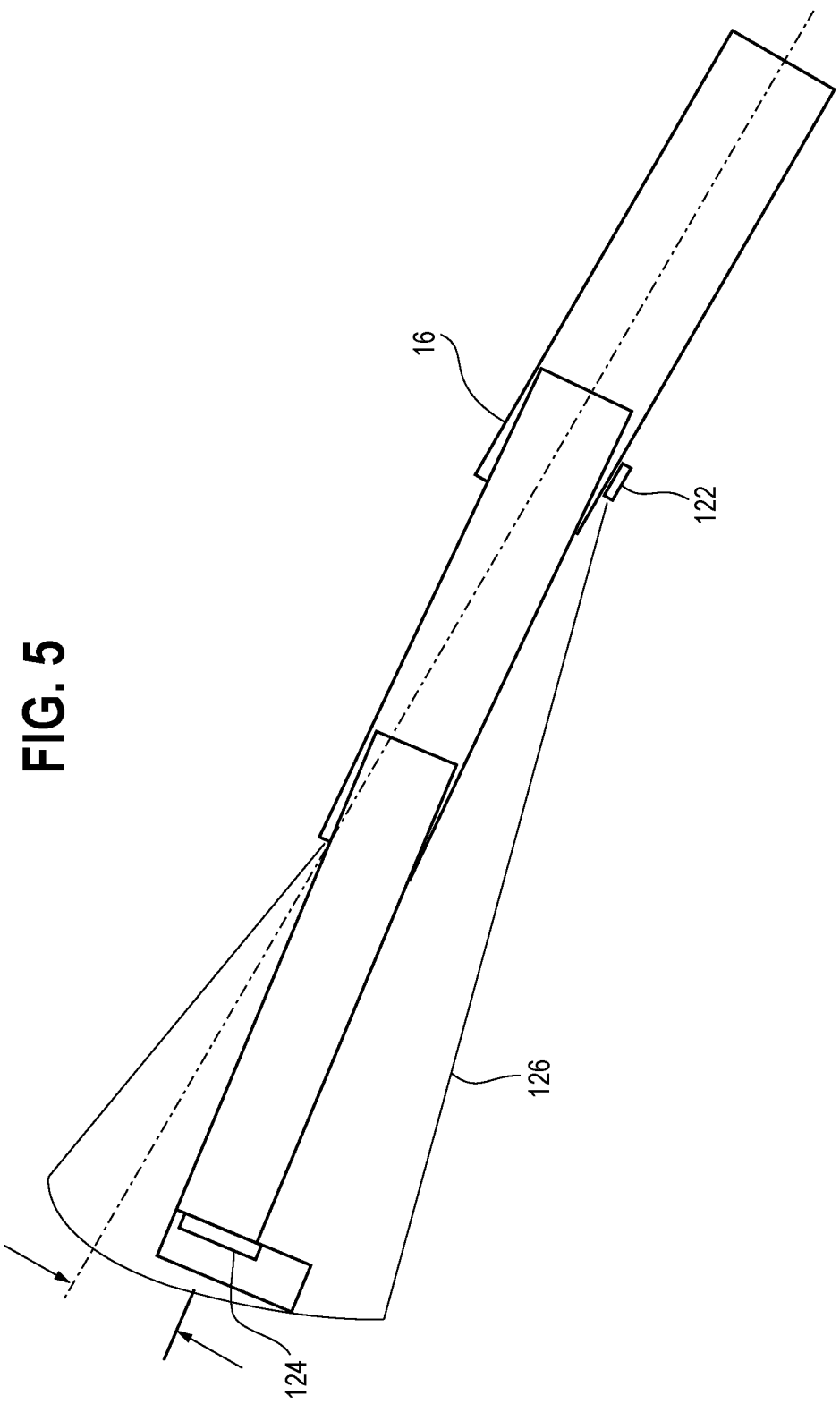
FIG. 5 is a diagram representing a side view of a vertically deflected boom and a sensor assembly installed on the boom, according to an embodiment.

FIG. 5 illustrates an example of a boom 16 in a vertically deflected condition, according to an embodiment. In some embodiments, such vertical deflection of the boom 16 may cause the laser beam 126 to become vertically offset from the receiver 124, and thus, not be detected by a photodetector 128.

Figure 7:
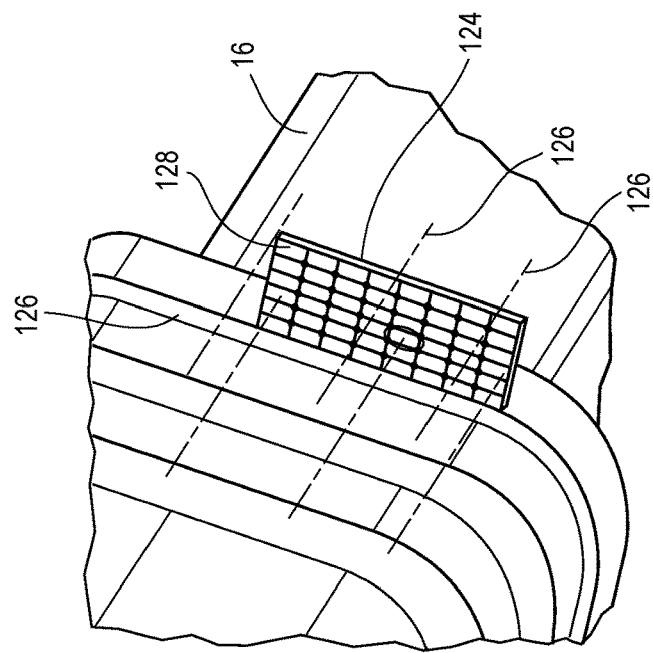
FIG. 7 is an enlarged perspective view showing a sensor assembly receiver connected to a boom of the crane of FIG. 6, according to an embodiment.
Figure 6:
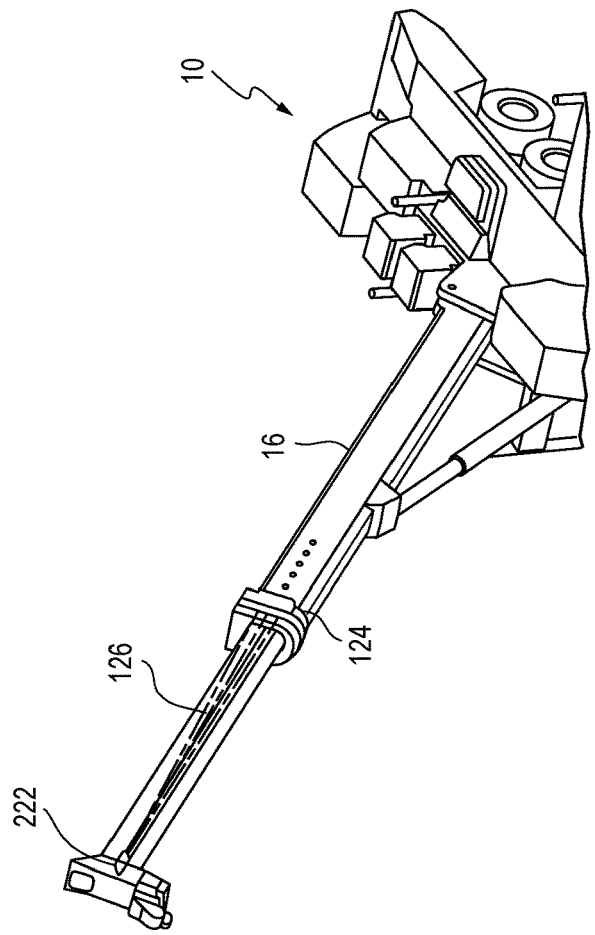
FIG. 6 is a perspective view of a crane having a system for determining a crane status, according to another embodiment.

FIG. 6 shows an example of the crane 10 having the system 110 for determining a crane status in which the sensor assembly 114 includes another embodiment of a transmitter 222. The transmitter 222 is configured to emit a plurality of laser beams 126 extending substantially in a vertical plane in the direction of the laser beams 126. FIG. 7 is an enlarged view of the receiver 124 toward which the plurality of laser beams 126 are generally directed. As shown in FIGS. 6 and 7, by way of transmitter 222, at least one laser beam 126 will remain incident upon the receiver 124 through a range of vertical boom deflections, when side deflection is within a predetermined threshold, and is detectable by a photosensor 128. The laser beams 126 will become horizontally offset from the receiver 124 when horizontal deflection of the boom 16 exceeds the predetermined range, and thus, the laser beams 126 will not be detected by a photosensor 128.

Figure 8:
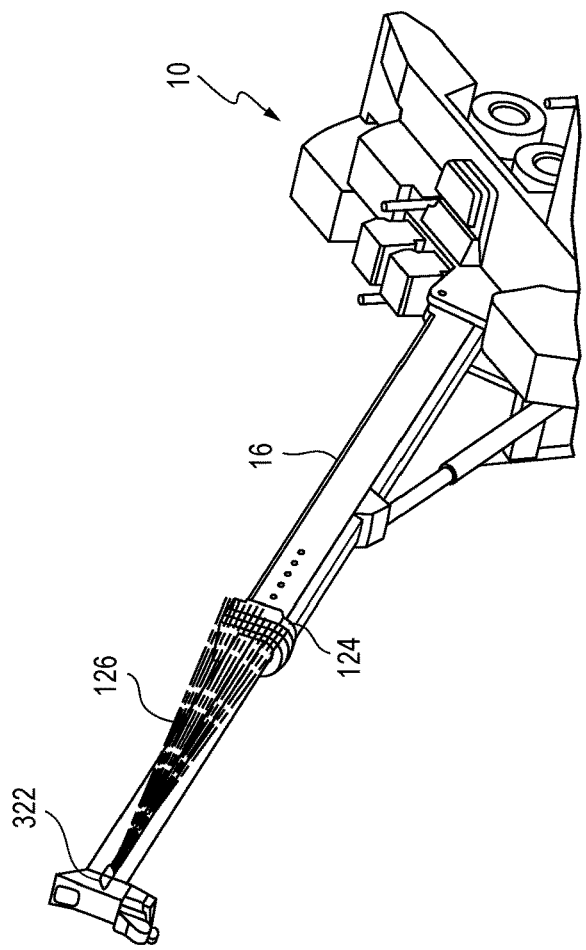
FIG. 8 is a perspective view of a crane having a system for determining a crane status, according to another embodiment.

FIG. 8 shows an example of the crane 10 having the system 110 for determining a crane status in which the sensor assembly 114 includes another embodiment of a transmitter 322. According to one embodiment, the transmitter 322 may include a diffraction device (not shown), such as one or more prisms or diffraction grating, configured to diffract a laser beam 126 along a line extending substantially in a vertical plane or horizontal plane, as desired, toward the receiver 124. That is, a laser beam 126 may be diffracted by the diffraction device to extend in a direction to be incident upon the receiver 124. For example, the laser beam 126 may be diffracted substantially in the vertical plane to become incident upon the receiver 124 when horizontal deflection is within a predetermined range. In such an embodiment, horizontal deflection may be measured. In one embodiment, the laser beam 126 may be diffracted substantially in a horizontal plane to be incident upon the receiver 124 when vertical deflection is within a predetermined range. In such an embodiment, vertical deflection may be measured. In one embodiment, the diffraction device may split the laser beam 126 into multiple laser beams in a known manner, the laser beams extending substantially in the vertical plane or the horizontal plane, as desired.

Figure 9:
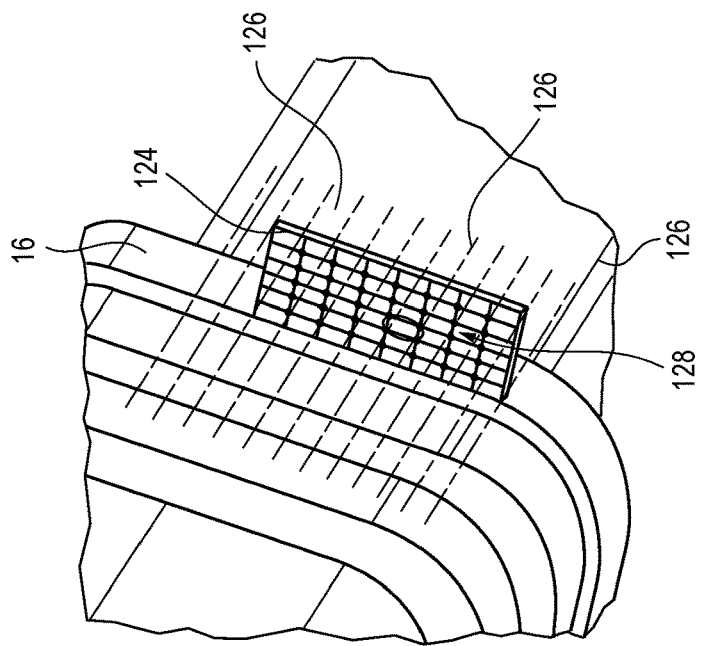
FIG. 9 is an enlarged perspective view showing a sensor assembly receiver connected to a boom of the crane of FIG. 8, according to an embodiment.

In one embodiment, a scanning operation may be performed by adjusting the diffraction device to direct the laser beam 126 through a range of angles in the vertical plane and/or horizontal plane as desired. FIG. 9 is an enlarged view of the receiver 124 toward which the plurality of laser beams 126 are generally directed. The system 110 may determine the horizontal boom deflection based on sensor information indicating whether a laser beam 126 is detected by a photodetector 128 in the manner detailed above. With diffraction known, either horizontally, vertically, or both, as well as a position of the laser beam 126 on the receiver 124, the horizontal deflection, vertical deflection, or both, may be determined. In one embodiment, the diffraction device may split the laser beam 126 into multiple beams, for example, due to crane jittering, shivering, oscillation and the like. The diffracted laser beam or beams 126 may then be detected along a line of reference points and/or on the array of photosensors 128 located on the receiver 124.

In another embodiment, the transmitter 122 may be rotatably mounted on the boom 16 to perform a scanning operation. For example, the transmitter 122 may be rotated by a motor through a range of angles in the vertical plane. Accordingly, the laser beam 126 would become incident on receiver 124 and detected by a photosensor 128 during at least a portion of the scanning operation, when side boom deflection is within the predetermined threshold. In one embodiment, a rated capacity limiter (RCL) of the crane may perform calculations to predict the vertical deflection of the boom 16. The transmitter 122 may be rotatably mounted on the boom 16 and operably connected to the system 110 and/or the RCL. The system 110 or RCL may control the motor (not shown) to adjust an angular position of the transmitter based on the predicted vertical boom deflection so that the laser beam 126 remains incident upon the receiver 124 through a range of vertical boom deflections, when the horizontal deflection is within predetermined limits.

Referring again to FIG. 24, in one embodiment, the system 110 may include a sensor assembly 414 in the form of an image capture device, such as a digital camera, which incorporates an image sensor configured to detect, for example, electromagnetic radiation, such as light. Information from the image sensor may be used for example, by the computer 112, to generate and capture an image within a field of view of the image capture device. Suitable cameras include, but are not limited wide-angle, stereo, telephoto, zoom, video and similar known cameras configured to capture an image in a field of view.

Alternatively, or in addition, the system 110 may include a sensor assembly 514 formed as a LiDAR assembly. As understood in the art, the LiDAR assembly 514 is configured to perform surveying operations and includes a transmitter configured to emit electromagnetic radiation, such as one or more laser beams, for example, as pulsed beams, and a receiver which includes a sensor, such as a photosensor, configured to receive reflected laser beams (i.e., reflections of the one or more laser beams emitted from the transmitter). The LiDAR assembly 514 may then provide sensor information indicative of the received reflected laser beams to the computer 112. The computer 112 may then generate a three-dimensional image of the captured field of view, i.e., a captured image, of the LiDAR assembly 514. In one embodiment, the computer 112 and LiDAR assembly 514 may be integrated.

In the embodiments above, the system 110 may include any one of the sensor assemblies 114, 414, 514, various combinations of the sensor assemblies (e.g., any two of the assemblies), or all of the sensor assemblies 114, 414, 514. In one embodiment, multiple sensor assemblies of the same type may be provided as well. Accordingly, in some embodiments, multiple and/or different sensor assemblies may provide sensor information to the computer 112.

The system 110 is configured to detect one or more objects in the captured image using one or more known, suitable, object detection algorithms which will be appreciated by those having ordinary skill in the art. Such known algorithms may relate to, for example, edge detection, brightness contrast, pixel density, blob detection, motion detection, and the like. The object detection algorithms may be feature-based or incorporate known deep learning techniques. The detected objects may include, for example, a crane component, a load being lifting by the crane, worksite obstacles adjacent to the crane, and a horizon.

The crane components which may be detected, include, but are not limited to, the boom 16, a flexible member 24 suspended from the boom 16 (FIGS. 10 and 11), sheaves 26 (FIGS. 17-19) around which the flexible member 24 may extend, anti-two block ("ATB") detection components 28, 30, 32 (FIGS. 15 and 16), a lifting appliance 34 (FIGS. 10 and 11), a tower crane mast (also referred to as a tower) (not shown), a tower crane trolley 746 (FIGS. 21 and 22), a trailing boom dolly (not shown), boom attachments 38 such as a jib extension (FIG. 19), support pendants (not shown), and a marker (not shown) on any of the crane components.

Figure 22:
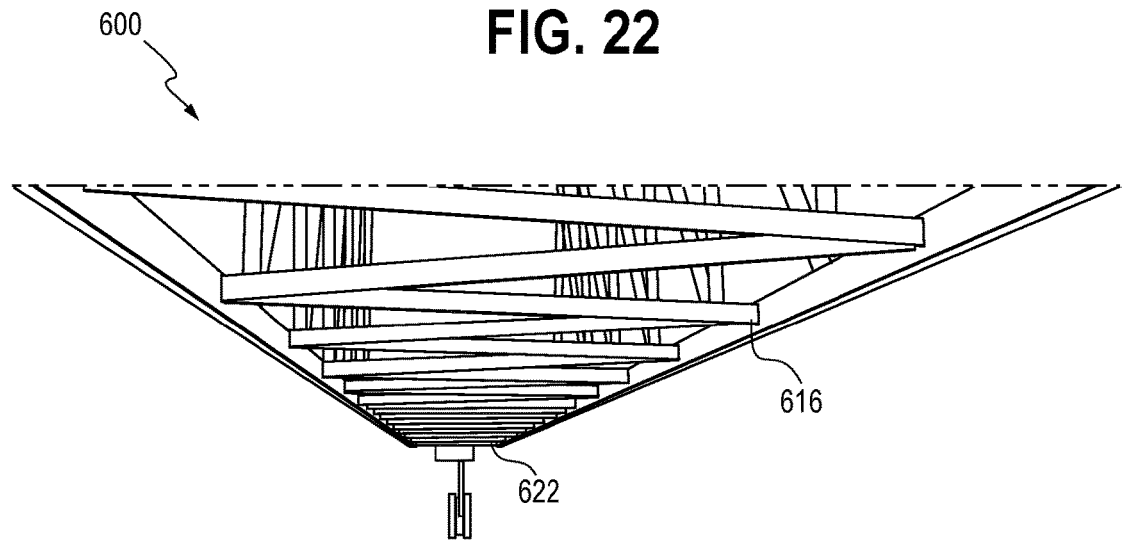
FIG. 22 is a diagram representing another image in which the lattice boom of FIG. 21 is provided, according to an embodiment.
Figure 23:
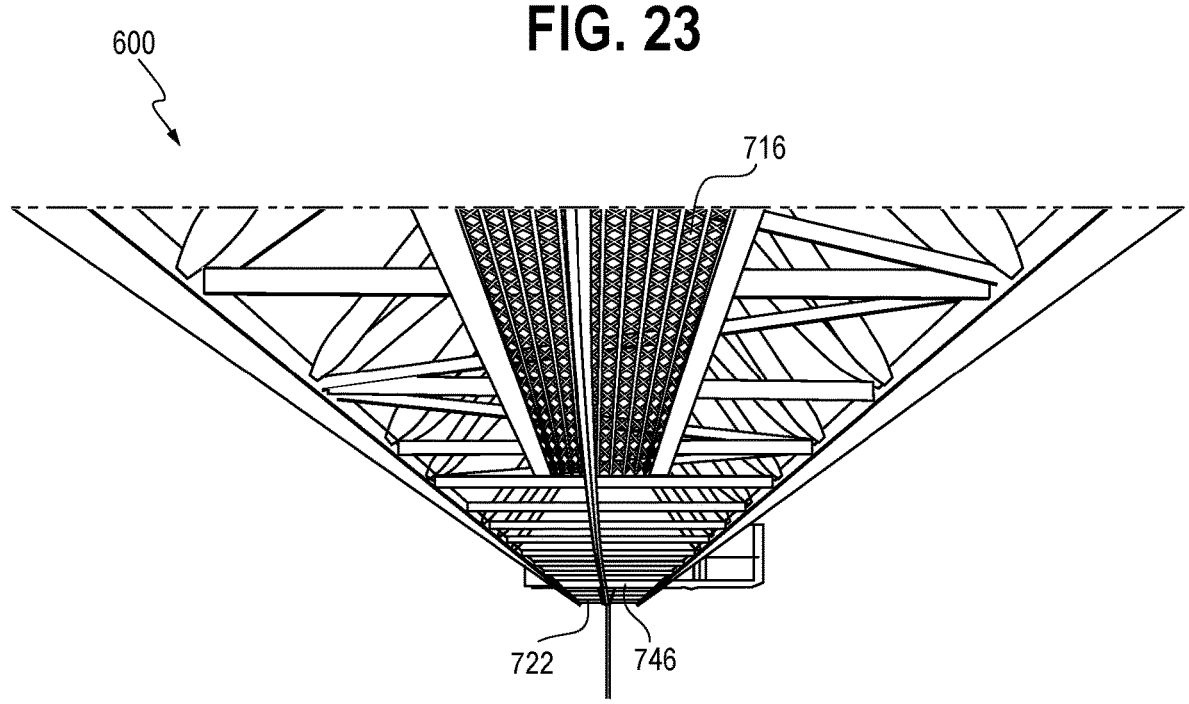
FIG. 23 is an example of a captured image in which a tower crane jib is provided, according to an embodiment.

The detected boom 16 may be any of a telescoping boom, lattice boom (616 in FIGS. 20-22), or tower crane jib (716 in FIG. 23). In addition, individual sections of the boom 16 may be detected, including telescoping sections or lattice sections. Further, individual cords of a lattice boom or jib section may be detected. The boom tip 22 may be detected on the boom 16 as well. A stop block (also referred to as a mousetrap) (not shown) may also be detected on the boom 16.

The flexible member 24 may be, for example, a rope or cable. Depending on the resolution of the captured image, individual components of the flexible member 24 may be detected as well, such as strands and/or wires. The ATB components which may be detected include, for example, an ATB switch 28, an ATB weight 30, an ATB flag (not shown), and an ATB chain 32. The detected lifting appliance 34 may be, for example, a hook-block or a headache ball. The marker (not shown) may be, for example, a particular color or coating, shape, or pattern, for example, a QR code, a bar code, or other pattern which may be detected in the captured and recognized by way of analyzing the captured image. It is envisioned that other objects, including other crane components generally positioned along, connected to, or formed integrally with the boom 16 or tower crane mast may be detected as well.

In one embodiment, the system 110 is configured to analyze the captured image and/or the detected object to determine one or more parameters of the detected object within the captured image. Such a parameter may include, for example, a position of the detected object in the captured image, a change in position of the detected object with respect to time in a series of captured images, a relative position of one or more detected objects including a distance between the detected object and a reference point in the captured image, one or more dimensions of the detected object in the captured image, an orientation, a direction of extension, and/or a size, shape, color or pattern of the detected object in the captured image.

The parameter within the captured image may be determined, for example, by counting pixels within the captured image or by measurements taken when a physical size of the captured image is known. In one embodiment, the reference point may be, for example a center point, a vertical midline, a horizontal midline, a boundary of the captured image, an initial position of the detected object, a predetermined threshold position, another detected object within the captured image, or any other suitable reference point or line. The reference point may be stored in the memory and/or provided in the captured image. The position of the reference point may be known and stored in the memory as well. In one embodiment, the crane status may be determined based on the determined parameters within the captured image.

The system 110 is also configured to analyze the captured image, for example, by analyzing the determined parameters within the captured image, to obtain one or more actual parameters of the detected object and/or in the captured image, an identity of the detected object, and/or a crane status. In one embodiment, the system 110 may analyze the captured image by way of an image/parameter compare technique which includes comparing one or more of the parameters of the detected object within the captured image to one or more known corresponding parameters of a known corresponding object in one or more stored images which may be stored in the memory. In one embodiment, actual parameters, a crane status, and/or a crane component identity of the corresponding object in the one or more stored images may be known and stored as additional information with the stored image. The stored images may also represent expected crane statuses, including expected positions or changes in position of known crane components.

For example, in one embodiment, a detected crane component in a captured image may be identified as corresponding to a known crane component, such as, but not limited to, a boom tip, a flexible member, a boom section, and the like, based on the additional information. The identification may be based on, for example, a parameter of the detected object in the captured image, such as size, shape or particular dimension of the detected object. In one embodiment, the system 110 is configured to count the number of detected objects, and thus, may count a number of detected objects that have been identified as corresponding to a particular crane component.

In one embodiment, when one or more parameters of the detected object in the captured image are found to match or substantially match one or more corresponding parameters of the corresponding object in a stored image, the additional information associated stored with the stored image may be associated with the detected object in the captured image. The actual parameters may refer to, for example, an actual measurement, dimension, position, distance and the like in the crane work environment. In this manner, actual parameters may be determined.

In one embodiment, the captured image and the one or more objects detected therein maybe compared to one or more stored images by superimposing one over the other, and comparing parameters of a detected object, for example, size, shape, dimensions, to those of a corresponding object in the stored images.

In one embodiment, the system 110 may analyze the captured image by using a scale factor technique, which includes applying a scale factor to one or more of the parameters of detected objects in the captured image to calculate an actual parameter. The scale factor may be determined, for example, by a calibration process in which actual parameters for detected objects are known and a ratio between the actual parameters and the parameters in the captured image may be determined. The scale factor may be stored in the memory.

In one embodiment, the actual parameters obtained in the calibration process may be stored in a table in the memory with corresponding parameters from the captured image. In such an embodiment, applying the scale factor includes looking up a parameter of the detected object in the captured image in the table to determine the actual parameter of the detected object. In one embodiment, the actual parameter may be determined by a calculation based on the parameter within the captured image and the scale factor.

In an embodiment of the system 110 in which a sensor assembly is a LiDAR assembly 514, the system 110 may determine one or more actual parameters of the detected object based on the sensor information received from the LiDAR assembly 514, e.g., sensor information obtained in a LiDAR surveying operation. This may be referred to herein as the LiDAR information technique. For example, based on the time between the transmitter 522 emitting a laser beam 126 and receipt of the reflected laser beam at the receiver 524, a distance to a detected object from the LiDAR assembly 514 may be determined. With this information, as well as other known information, such as an orientation or angle of the emitted laser beam 126, the system 110 may carry out various calculations based on trigonometric and/or geometric functions to determine, for example, an actual position of the detected object relative to a reference point (such as the LiDAR assembly 514), an actual distance between the detected object and a reference point or other detected object, and other relevant, suitable measurements.

The system 110 is configured to determine the crane status based on the one or more detected objects. In one embodiment, system 110 may determine the crane status based on the one or more detected objects and one or more of parameters of the detected objects in the captured image. In one embodiment, the system 110 may determine the crane status based on the one or more detected objects, one or more of the parameters of the detected objects in the captured image, and an analysis of the captured image and/or the one or more detected objects in the captured image.

In some embodiments, the crane status and the one or more actual parameters may be one and the same. In some embodiments, the crane status and the one or more parameters of the detected object in the captured image may be one and the same, i.e., the crane status may be a parameter of a detected object in the captured image, for example, the position or distance of a detected object relative to a reference point or other detected object.

According to embodiments herein, the crane status may include, for example: vertical boom deflection; side (or horizontal) boom deflection; boom length; boom section length, number of boom sections, type of boom sections, boom attachment installation condition and position (e.g., stowed, extended, not installed); boom attachment length; boom attachment offset; ATB component status including installation, correct positioning, condition, relative positioning; ATB status of the crane; reeving conditions including number of flexible member lines reeved, optimal reeving configuration, retaining pin installation status, sheave rotation; telescopic pick point; flexible member condition; pendant rope length; correct positioning of crane components; number of falls; number of flexible members; differences in construction from desired or expected construction; trolley position; tower crane mast deflection; tower crane mast twist; boom twist; load sway; trailing boom monitoring; jib rigging mode; and flexible member speed.

FIGS. 10-22 show various examples of crane statuses which may be determined by the system 110. However, these examples are not exhaustive, and it will be appreciated that other crane conditions not shown in the figures or specifically identified in the following examples may be determined as well, based on the detection of objects in captured images described herein.

Figure 10:
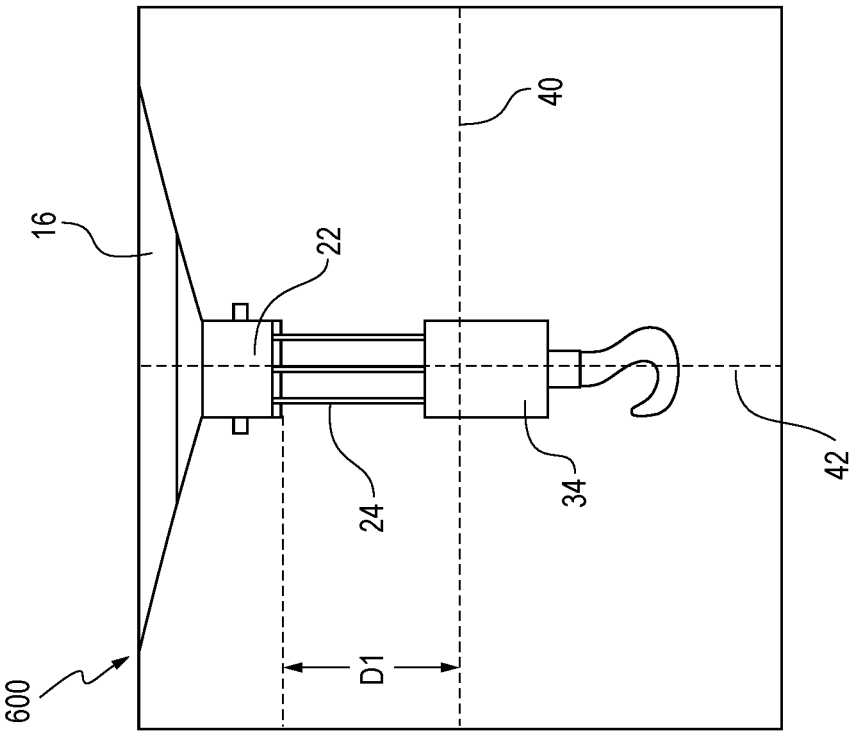
FIG. 10 is a diagram representing an image in which the boom is substantially undeflected, according to an embodiment.

FIG. 10 is a representation of a captured image 600, generated, for example, by the computer 112 based on sensor information from the sensor assembly 414 or the sensor assembly 514. That is, the captured image 600 may be an optical image from an image captured device such as a camera, or a LiDAR image from the LiDAR assembly 514. According to an embodiment, the system 110 may detect one or more objects in the captured image, such as the boom tip 22. In one embodiment, the system 110 may superimpose, or store in the memory, horizontal and vertical reference lines 40, 42 at known reference positions.

In one embodiment, the system 110 may analyze the captured image and/or the detected objects to determine one or more parameters of the boom tip 22 in the captured image 600, such as a vertical position of the boom tip 22 and/or a distance of the boom tip 22 from a reference point, such as the horizontal midline 40. The system 110 may analyze the captured image 600, for example, the parameters in the captured image determined above, using any of the image/parameter compare, scale factor, and/or LiDAR information techniques) described herein. In one embodiment, an actual parameter for a change in vertical position or vertical distance from a known non-deflected vertical position of the boom tip 22 may be determined, and thus, the vertical deflection crane status may be determined.

Figure 11:
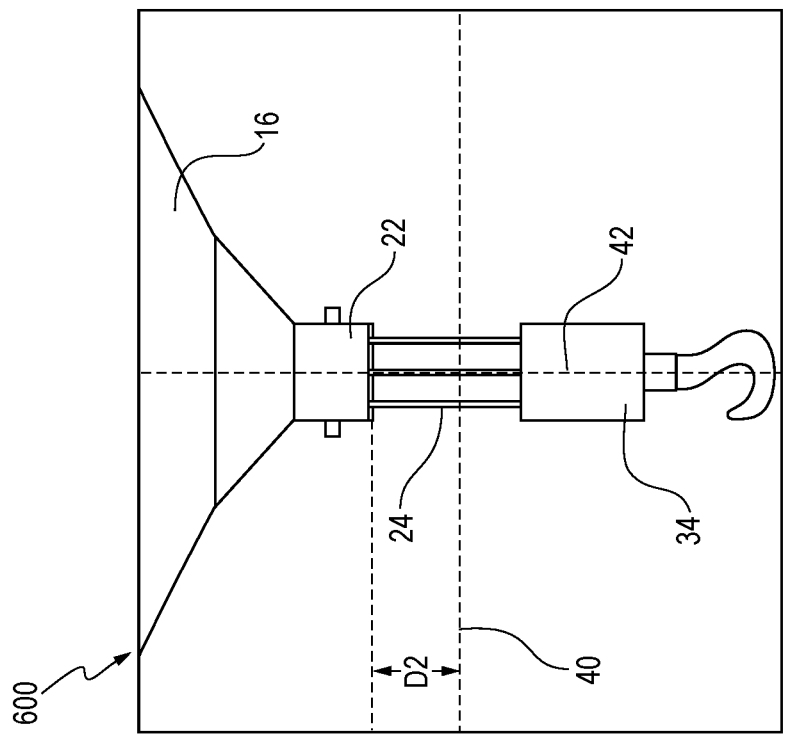
FIG. 11 is a diagram representing an image in which the boom is vertically deflected, according to an embodiment.

FIG. 11 is another representation of the captured image 600 in which the boom 16 is vertically deflected. Vertical deflection of boom tip 22 may be determined in the manner described above with respect to FIG. 10. In one embodiment, for example, the vertical deflection may be determined as the change in vertical distance of the boom tip 22 from the horizontal midline 40 from the initial undeflected position (D1 in FIG. 10) to the deflected position (D2 in FIG. 11).

In some instances, a parameter of the detected object in the captured image 600 may not match a parameter of the corresponding object in a stored image. In one embodiment, the system 110 may retrieve the additional information for stored images in which the corresponding object has parameter values nearest to those of the detected object, identify the corresponding actual parameters, and interpolate to determine or estimate the actual parameters of the detected object.

Figure 12:
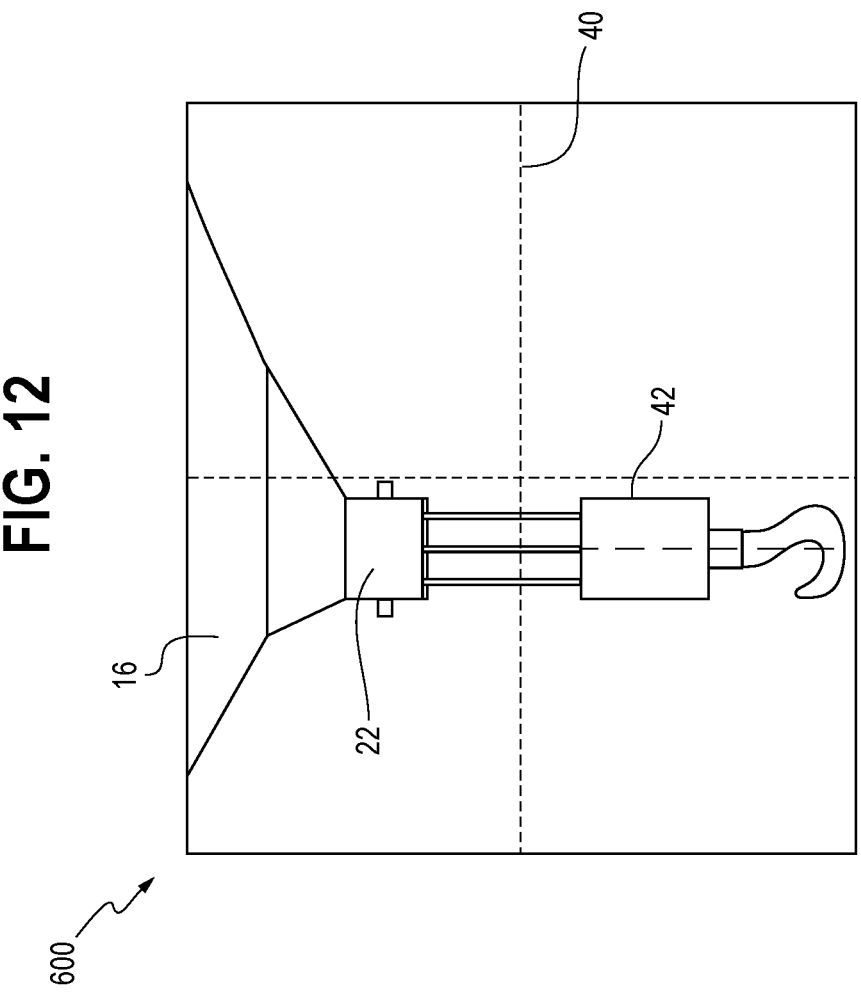
FIG. 12 is a diagram representing an image in which the boom is vertically and horizontally deflected, according to an embodiment.

FIG. 12 is a representation of a captured image 600 in which the boom 16 is horizontally (or side) deflected. In one embodiment, the system 110 may detect an object, such as the boom tip 22, and determine one or more parameters of the detected object in the captured image 600, such as a horizontal position or change in position of the boom tip 22, and/or a distance of the boom tip 22 from a reference point, such the vertical reference line 42. The system 110 may analyze the captured image 600 and/or the detected object, such as the boom tip 22, using any of the image/parameter compare, scale factor or LiDAR information techniques described herein to determine the horizontal deflection of the boom 16 as the crane status. It is understood that vertical and horizontal boom deflection, as well as other crane statuses described below may be determined from the same captured image 600.

FIG. 13 is a representation of a captured image 600 in which the boom 16 is extended, and FIG. 14 is a representation of a captured image 600 in which the boom 16 is retracted. In one embodiment, the system 110 may detect one or more objects, such as the boom tip 22, in the captured image 600. The system 110 may determine one or more parameters of the detected object in the captured image, such as, a height 'h', width 'w' and/or diagonal 'd' of the boom tip 22. In one embodiment, the parameters of the detected object in the captured image 600 decrease in value as the boom 16 extends and increase in value as the boom 16 retracts. The system 110 may analyze the captured image 600, and/or the detected object, such as the boom tip 22, using any of the image/parameter compare, scale factor or LiDAR information techniques above to determine the boom length as the crane status. In one embodiment, a boom length may be determined in the manner above for each of the one or more determined parameters. The boom lengths may then be averaged to produce a single boom length value. However, the present disclosure is not limited to such a technique, and the boom length may be determined using only one parameter in some embodiments.

In one embodiment, the system 110 may detect one or more boom sections of the boom 16 in the captured image, including the ends of the boom section. The system 110 then determine a length of the boom section using any one or more the of the techniques described herein.

Figure 16:
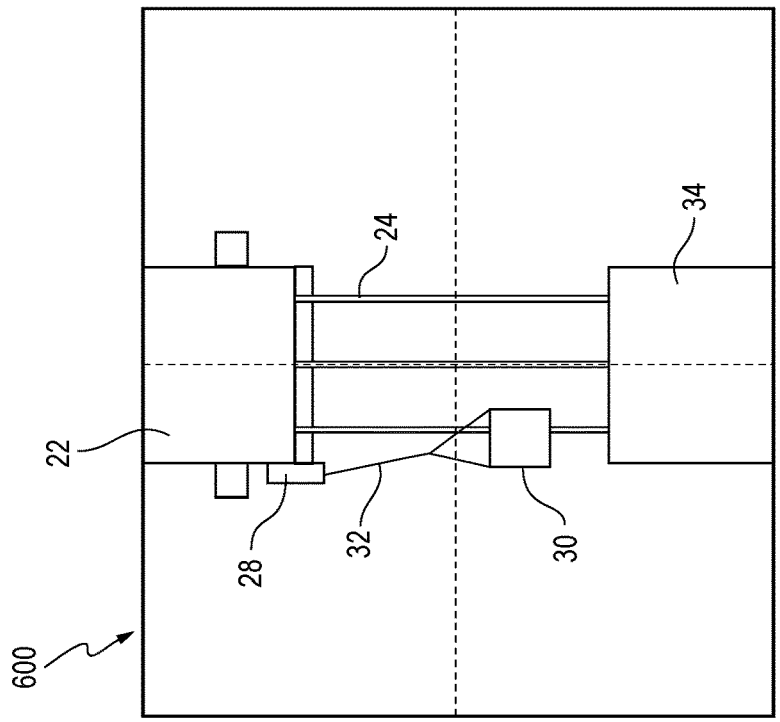
FIG. 16 is a diagram representing an image in which the boom is retracted and includes anti-two block components, according to an embodiment.
Figure 15:
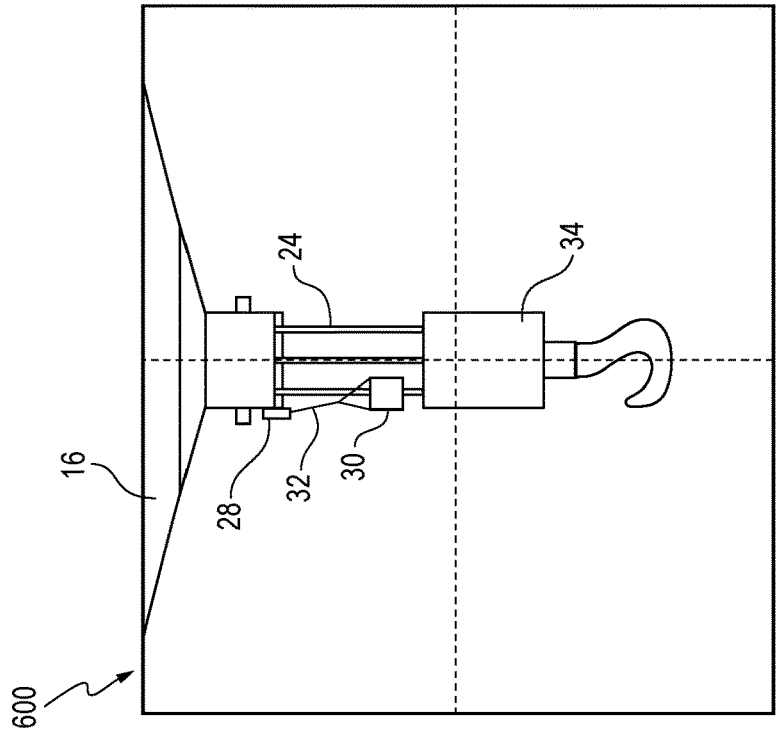
FIG. 15 is a diagram representing an image in which the boom is extended and includes anti-two block components, according to an embodiment.

FIG. 15 is a representation of a captured image 600 in which an ATB condition may be monitored when the boom 16 is in an extended position, and FIG. 16 is a representation of a captured image 600 in which the ATB condition may be monitored when the boom 16 is in a retracted position. The system 110 may detect one or more objects in the captured image 600, such as various ATB components, including, but not limited to an ATB switch 28, an ATB weight 30, ATB flag (not shown) and an ATB chain 32. The system 110 may determine one or more parameters of the detected objects, such as the position, position relative to a reference point, size, shape, color, pattern, dimensions, and the like, of the various ATB components 28, 30, 32.

In one embodiment, the system 110 may analyze the captured image 600 and/or the various components 28, 30, 32, using any of the aforementioned image/parameter compare, scale factor and/or LiDAR information techniques, as appropriate. Accordingly, in one embodiment, the system 110 may determine which ATB components are installed by identifying the detected objects, if the ATB are correctly positioned and dimensioned (e.g., correct length), and if the ATB components are in an undesired operating condition (e.g., tangled), as a crane status.

In one embodiment, the system 110 may determine an ATB status of crane. For example, the system 110 may detect one or more objects in the captured image 600, such as the lifting appliance 34 and the boom tip 22. The system 110 may determine one or more parameters of the detected objects in the captured image 600, such as a position, distance or change in distance between the detected lifting appliance 34 and boom tip 22. In one embodiment, the system 110 may determine an ATB condition as the crane status based on the one or more parameters of the detected objects in the captured image 600. Alternatively, or in addition, the system 110 may determine an ATB condition as the crane status based on an analysis of the captured image 600 and/or the detected objects, using any of the aforementioned image/parameter compare, scale factor or LiDAR information techniques.

FIG. 17 is a representation of a captured image 600 in which a correct reeving is provided, and FIG. 18 is a representation of a captured image 600 in which an incorrect reeving is provided, according to embodiments. The system 110 may detect one or more objects in the captured image 600, such as the flexible member 24 (including individual lines of the flexible member 24) and one or more sheaves 26 at the boom tip 22 and/or the lifting appliance 34. The system 110 may determine one or more parameters of the detected objects in the captured image 600, such as the positions, relative positions, shapes and/or sizes of the flexible member 24 and the sheaves 26.

The system 110 may analyze the captured image 110 and/or the detected objects, such as the flexible member 24 and sheaves 26, using any of the aforementioned image/ parameter compare, scale factor, or LiDAR information techniques. From the analysis, the system 110 may identify and count individual lines of the flexible member 24 and the sheaves 26. Accordingly, the system 110 may determine the number of lines 24 reeved as the crane status.

The system 110 may also determine whether the detected reeving is an optimal reeving. For example, system 110 may store images or actual parameters of optimal reeving configurations for a given number of lines of the flexible member 24. With the number of detected lines determined in the manner above, and various parameters in the captured image 600 determined in the manner above, including the relative positions of the detected lines 24 and the sheaves 26, the system 110 may determine whether the detected reeving in the captured image 600 corresponds to an optimal reeving stored in the memory. Accordingly, the system 110 may determine a crane status as having an optimal or non-optimal reeving. In a similar manner, the system 110 may determine whether the lines 24 are correctly reeved.

The system 110 may also determine whether various components of the reeving, such as retaining pins, are present in the captured image, for example, by identifying the detected objects as corresponding to particular components as detailed above and comparing the detected (and identified) objects to a corresponding list of expected objects stored in the memory. Alternatively, or in addition, a stored image having expected objects identified therein may be compared to the captured image 600 to determine if the expected objects are present in the captured image. The system 110 may also determine if the detected objects are correctly positioned in a similar manner.

The system 110 may determine the crane status to be a status of the sheaves 26, for example, as locked or turning. For example, the system 110 may analyze the detected sheaves 26 by comparing a current captured image 600 to previously captured images 600 to determine a change in position of the sheave 26 with respect to time. In one embodiment, the sheave 26 may have one or more markers (not shown) thereon which may be detected in the captured image 600. The system 110 may determine if a position of the marker has changed in a manner indicative of sheave rotation. Alternatively, or in addition, the detected marker may be identified as corresponding to a known marker having additional information associated therewith stored in the memory. The additional information may include rotational position information. Different markers may be included on the sheave 26 having additional information that is indicative of different rotational positions of the sheave 26. In a similar manner, the system 110 may determine a rotational speed of the sheave 26, and in turn, a speed of the flexible member 24 on the sheave 26.

FIG. 19 is a representation of a captured image 600 in which an end of the boom 16 is positioned, according to an embodiment. In one embodiment, the system 110 may detect one or more objects, such as the boom tip 22 and the boom attachment 38. The system 110 may determine one or more parameters of the detected objects in the captured image 600, such as a position, relative position, shape, size, dimensions and the like of the boom tip 22 and/or the boom attachment 38. The system 110 may analyze the captured image 600 and/or the detected objects in the captured image 600 using any of the image/parameter compare, scale factor or LiDAR information techniques above. From the analysis, the system 110 may identify the detected objects as corresponding to particular crane components. Accordingly, the system 110 may determine whether the boom attachment 38 is detected in the captured image 600. Thus, the system 110 may determine whether the boom attachment 38 is installed as a crane status. In addition, the system 110 may determine whether the boom attachment 38, if installed, is in its stowed position alongside the boom 16 (as shown in FIG. 19), or extended position at the boom tip 22, based on the analysis of the captured image 600. Further still, the system 110 may determine a length and/or offset of the boom attachment 38 based on the analysis.

The system 110 may determine other crane statuses from the captured images 600 shown in FIGS. 10-19 as well. For example, as detailed above, the system 110 may detect the flexible member 24 in the captured image 600. In one embodiment, the system 110 may also detect individual strands or wires of the flexible member 24. The system 110 may determine one or more parameters of the detected flexible member 24 and/or wires or strands, such as the position, relative position, shape and/or size, in the captured image. The system 110 may analyze the captured image 600 and/or the detected objects using any of the techniques above, and determine, based on the analysis, a type of flexible member and a condition (such as a wear and/or damage condition) of the flexible member 24.

In one embodiment, the system 110 may determine the pick point and hoist used. For example, the system 110 may detect the boom tip 22, an auxiliary boom (not shown) and the flexible member 24 in the captured image 600. The system 110 could also detect one or more sheaves 26. The system 110 may determine one or more parameters of the detected objects, such as the position, relative position, size, shape and the like, of the detected objects. The system 110 may analyze the captured image 600 and/or the detected objects to determine whether the flexible member 24 is moving. Such an analysis may include a comparison to previous captured images to determine if a position of the flexible member 24 has changed with respect to time. In one embodiment, the flexible member 24 includes markers which may be detected in the captured image 600, and a position of the detected markers may be used to determine if the flexible member is moving. The system 110 may then determine whether the moving flexible member extends from the main boom (boom tip 22) or the auxiliary boom, based on the relative positions of each. In addition, with movement of the flexible member 24 detected, the system 110 may determine which hoist is driving the movement by identifying the hoist in operation during movement of the flexible member 24, based on external sensor or control system information.

In the embodiments above, the crane status may be determined by the system 110 for a boom 16 implemented as any of a telescoping boom, lattice boom or tower crane jib. In addition, the system 110 may determine a crane status, including those above, based on the detection of objects which may be specific to certain types of booms, such as a lattice boom or tower crane jib.

Figure 21:
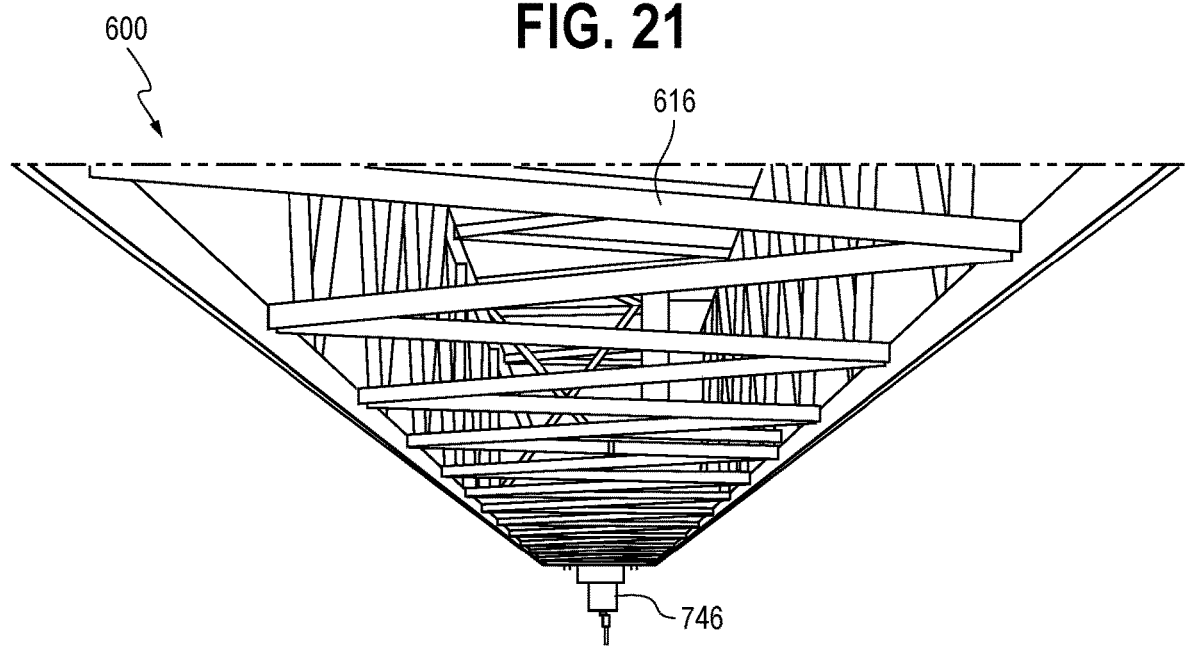
FIG. 21 is a diagram representing another image in which a lattice boom is provided, according to an embodiment.

FIG. 20 is a representation of a captured image in which the boom 16 is a lattice boom 616, for example, of the type typically installed on a crawler or derrick crane. FIGS. 21 and 22 are other representations of captured images 600 in which the boom 16 is lattice boom 616, according embodiments. Referring to FIGS. 20-22, the system 110 may detect one or more objects in the captured image 600, such as, the lattice boom 616, a lattice boom section 644, a lattice cord 646, the lattice boom tip 622 and the like. The boom tip 622 of the lattice boom 616 may be substantially held against vertical deflection by pendant ropes (not shown). However, the lattice boom 616 may still deflect vertically at an intermediate portion along its length. The system 110 may determine such vertical deflection of the lattice boom 616 by analyzing the captured image 600 and/or the detected objects according to any of the image/parameter compare, scale factor and/or LiDAR information techniques detailed above.

In one embodiment, the system 110 may determine vectors for one or more detected lattice cords 646. The vectors generally correspond to an orientation or direction in which the lattice cords 646 extend. The system 110 may analyze the vector according to any of the image/parameter compare, scale factor and/or LiDAR information techniques described here, to determine vertical deflection of the lattice boom 616. In one embodiment, the system 110 may determine vertical deflection of the lattice boom 616 based on an analysis of the vectors. For example, the system 110 may determine that the lattice boom 616 is substantially undeflected if the vectors are substantially parallel with one another. Conversely, the system 110 may determine that the lattice boom 616 is vertically deflected if one or more vectors are angled relative to one another. The system 110 may also measure the vertical deflection based on the angle between the vectors.

In one embodiment, the system 110 may determine side deflection of the lattice boom 616 in a manner similar to that described above with respect to vertical deflection of the lattice boom 616. Alternatively, or in addition, the system 110 may determine side deflection of the lattice boom 616 based on support pendants detected in a captured image 600. For example, although not shown in the drawings, the sensor assembly 414 and/or 514 may be positioned on the crane 10 such that support pendants are captured within the field of view. The system 110 may detect one or more support pendants in the captured image and determine one or more parameters of the detected support pendants, such as position, change in position, relative position, shape, size and the like, in the captured image. The system 110 may analyze the captured image and/or the detected support pendants according to any of the techniques above. Accordingly, the system 110 may detect whether tension has decreased in a support pendant based on a change in shape or position, for example. A decrease in tension in the support pendant is associated with side deflection of the lattice boom 616. Thus, the system 110 may determine the crane status of lattice boom side deflection in this manner.

The system 110 may also be configured to determine various other crane statuses related to lattice booms 616 as well, based on an analysis according to any of the image/parameter compare, scale factor and/or LiDAR information techniques above. For example, the system 110 may determine a length of a detected pendant rope, whether an additional lifting flexible member is installed, whether other crane components and/or attachments are installed, proper crane construction, a number of falls and proper crane component positioning.

FIG. 23 is a representation of a captured image 600 in which the boom 16 is a tower crane jib 716, according embodiments. In one embodiment, a tower crane jib may be a substantially horizontally extending jib along which a trolley is moveable for displacing the flexible member, lifting appliance and load in a horizontal direction. The tower crane jib may also refer to a luffing jib which is displaceable through a range of angles in a vertical plane (i.e., a lifting angle). In one embodiment, the sensor assembly may be positioned to have a line of sight along the length of an underside of the jib 716. The system 110 may detect one or more objects in the captured image 600, such as the jib 716, a trolley 746 movable along the jib 716 and a jib tip 722. The system 110 may determine one or more parameters of the detected objects, such as a size, position, change in position and/or one or more dimensions of the detected trolley 746. The system 110 may analyze the captured image 600 and/or the one or more detected objects, such as the trolley 746, according to any of the techniques described herein. Accordingly, the system 110 may determine a position of the trolley 746 as the crane status.

The system 110 may determine vertical deflection of the tower crane jib 716 in the same manner as vertical deflection is determined in the embodiments above. Alternatively, or in addition, the system 110 may detect a horizon (not shown) in the captured image 600, and determine, for example, a position, change in position, and/or distance from a reference point, such as the jib tip 722, in the captured image 600. The captured image 600 and/or the detected horizon (and optionally the jib tip 722) may be analyzed according to any of the techniques above. The system 110 may determine the vertical deflection of the jib 716 as the crane status based on the analysis.

The system 110 may also determine an ATB status of the tower crane in substantially the manner as described in the embodiments above. However, it is understood that in a tower crane environment, the system 110 may detect the trolley 746 or sheaves on the trolley 746 in the captured image, rather than a boom tip 22 or sheaves at the boom tip 22.

In one embodiment, the sensor assembly 414, 514 may be positioned on the tower crane to have a line of sight along a length the lower works, implemented in the tower crane as a vertically extending mast (not shown). As understood in the art, the tower crane jib 416 is supported on, and extends from the mast. The system 110 may determine tower mast deflection of a tower crane. In one embodiment, the system 110 may detect one or more objects, such as the mast or a mast end in the captured image, and determine one or more parameters of the detected object, such as the position, change in position, distance from a reference point, size, shape, orientation and the like, in the captured image. The system 110 may analyze the captured image and/or the detected object, such as the mast end, according to any of the techniques above. In this manner, the system 110 may determine a mast deflection, the mast height and/or mast twist as the crane status. In one embodiment, the twist may refer to a displacement, for example, a rotational displacement about a longitudinal axis, of the mast. Using similar techniques, a twist of a boom, including a telescoping boom, lattice boom, and/or tower crane boom, i.e., a tower crane jib, may be determined as well.

Alternatively, or in addition, the system 110 may detect the horizon in the captured image 600 and determine one or more parameters of the horizon in the captured image, such as a position, change in position and/or distance from a reference point. The system 110 may analyze the captured image and/or the detected object, such as the horizon, according to any of the techniques above, and may determine mast deflection as the crane status based on the analysis.

Further, in some embodiments, the system 110 may determine both forward/backward deflection and side-to-side deflection. In one embodiment, the upper works 14 of the tower crane, including the jib 716, may slew 360 degrees in order to detect the horizon. Images obtained in the 360 degree slew operation may be stored and referenced as the basis for determining a future crane status, for example using the image/parameter compare technique. A difference in level (i.e., position) of the horizon in a captured image and the stored images may be sorted out by comparing an expected position of the horizon to the position of the horizon in the captured image. The sensor assembly 414, 514 should be mounted level with regards to the crane.

If the system 110 determines that the position of the detected horizon in the captured image does not match the position of the horizon as setup and calibrated, the system 110 may determine that there was some amount of deflection during the 360 degree slew operation. This difference in position may then be compensated for, and a true horizon level may be set and stored. Subsequently, the system 110 may determine an absolute deflection of the tower. The 360 degree slew operation, while not limited to a particular environment, may be suitable for determining a position of the horizon when surrounding buildings are in the field of view of the sensor assembly which may block a line of sight to the horizon at some slew angles. It will be appreciated that various deflections of the tower crane may result from a lifting operation or environmental causes, such as wind or sun.

Referring generally to the crane 10, including a crane 10 having the boom 16 implemented as any of a telescoping boom, lattice boom or tower crane jib, the system 110 may further determine a height of the lifting appliance 34, a horizontal position of lifting appliance 34, and a swaying condition of the lifting appliance 34. For example, the system 110 may detect one or more objects, such as the lifting appliance 34 and the boom tip 22 in a captured image 600. The system 110 may determine one or more parameters of the detected objects, such as a position, change in position and/or distance from a reference point, including a distance between the lifting appliance 34 and boom tip 22, in the captured image 600. The captured image 600 and/or the detected objects may be analyzed according to any of the techniques above.

Accordingly, with a boom tip height known through conventional crane monitoring methods, a height of the lifting appliance 34 may be determined, for example, based on the distance between the detected lifting appliance 34 and the boom tip 22. In one embodiment, a determined vertical deflection of boom 16, described above, may be used to adjust the conventionally determined boom tip height. In addition, the horizontal position the lifting appliance 34 may be determined, for example, based on the horizontal distance between the detected lifting appliance and vertical reference line 42. The vertical reference line 42, in one embodiment, represents a horizontal position of the boom 16.

Further, the system 110 may determine a swaying condition based on the horizontal position of the lifting appliance 34 and/or a change in the horizontal position of the lifting appliance. In one embodiment, the system 110 may be operably connected to one or more crane components, and in response determining a sway condition, control the one or more crane components to take corrective movements until the sway condition is no longer detected, or substantially prevent crane movements which may produce a sway condition.

The system 110 may be configured to determine a trailing boom status, for example, during transport of the crane 10. For instance, the system 110 may detect one or more objects, such as the boom 16, boom tip 22 and/or trailing boom dolly (not shown), if present. The system 110 may analyze the captured image and/or the detected objects and determine if trailing boom dolly is present in the captured image based on parameters and techniques described above. For example, the system 110 may identify a detected object in the captured image 600 as corresponding to a trailing boom dolly based on a size or shape of the detected object. In one embodiment, the system 110 may analyze the captured image 600 by searching for objects within the captured having parameters which correspond to known parameters of a trailing boom dolly stored in the memory.

In one embodiment, the system 110 may determine relative positions of the boom 16 and the trailing boom dolly in the captured image and based on an analysis of the captured image 600 and/or detected objects, determine if the boom 16 and trailing boom dolly are properly positioned for transport. In one embodiment, a captured image, images or video in which the trailing boom condition is captured may be presented on the display device 118 so that an operator may monitor the trailing boom.

The system 110 may also determine a jib-rigging mode of the crane 10. For example, the system 110 may detect a stop block (also referred to as a mousetrap, not shown) on the boom 16 in a captured image 600, and determine one or more parameters of the detected stop block, such as a position, change in position, relative position, size or shape in the captured image. The system 110 may analyze the captured image 600 and/or the detected the stop block and determine, for example, the position of the stop block along the boom 16. A relationship between the position of the stop block and the jib-rigging mode may be known and stored in the memory. Accordingly, the system 110 may determine the jib-rigging mode.

As discussed above, one of the objects which may be detected by the system 110 in a captured image is a marker (not shown) that is disposed on or attached to a crane component. In one embodiment, the system 110 may analyze the marker according to any of the image/parameter compare, scale factor and/or LiDAR information techniques above. For example, the system 110 may compare the detected marker to one or more stored markers in the memory, and retrieve additional information associated with the stored marker when the stored marker is found to match the detected marker. The additional information may include, for example, an identity of a particular crane component, component specifications and the like. Thus, in one embodiment, a crane component in a captured image may be identified as a particular crane component based on the analysis of a marker detected on the crane component in the captured image.

In the embodiments above, the captured image 600 may be stored in the memory and the object detection, parameter determination, analysis and determining steps described above may be carried out by the system 110 in the memory. However, in some embodiments, the system 110 may include, or be operably connected to a display device 118 on which the captured image may be displayed.

In one embodiment, the system 110 may detect one or more boom sections in a captured image and count the number of detected boom sections. In one embodiment, the system 110 may identify the detected boom sections as corresponding to known boom sections, and further, may identify the type of boom section. The system 110 may perform these operations using any of techniques described herein, as appropriate.

In some embodiments, the determined crane status may be output to a crane control system, including, for example, a rated capacity limiter (RCL). For instance, actual parameters determined by the system 110 may be provided to the crane control system, including the RCL, and crane movements or functions may be controlled (including limiting movements) based, at least in part, on the actual parameters. That is, the crane control system may be operably connected to one or more of the crane components and may control operation of the crane components based on the crane status. For example, one or more crane components may be controlled to prevent movements which would further or maintain an undesired crane status. Additionally, the crane components may be controlled to move out of an undesired crane status. Further, the crane components may be controlled to prevent movement into an undesired crane status. In one embodiment, the crane control system may output the crane status for example, on the display device 118, or any other visual, audio and/or tactile indicator. In one embodiment, an alert or alarm may be output based on the determined crane status. In one embodiment, the crane control system and the system 110 may be integrated as a single system.

Figure 25:
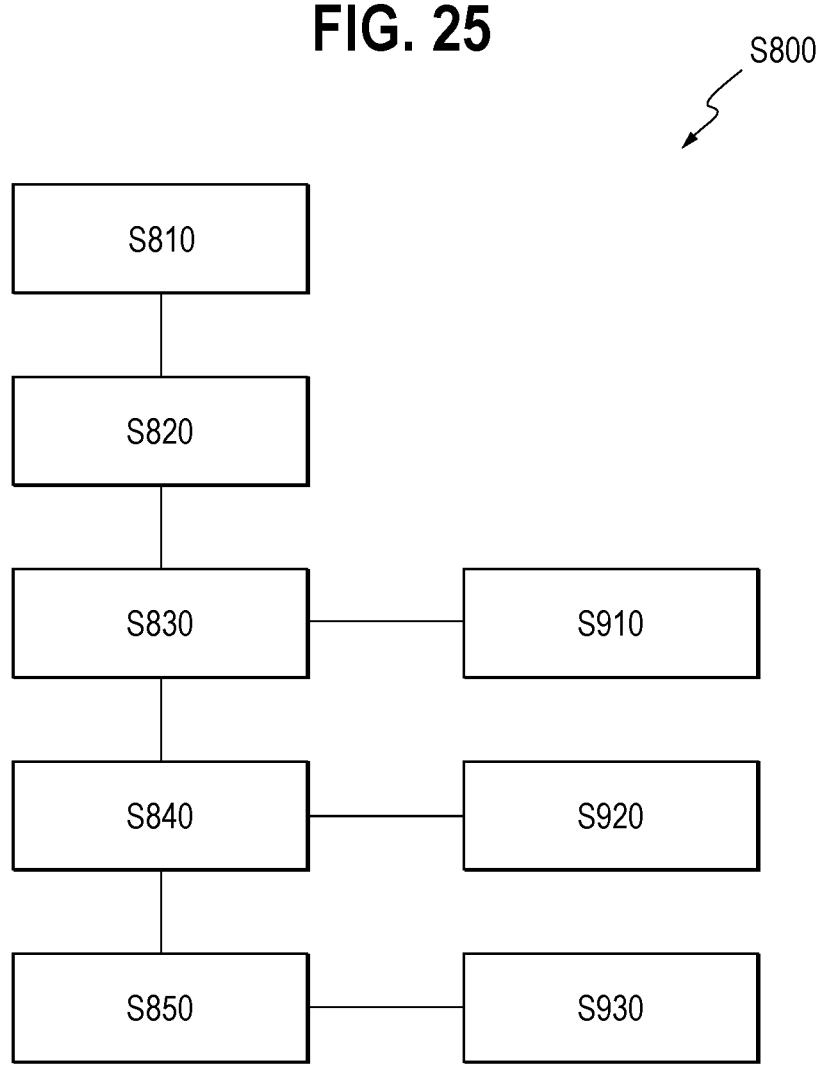
FIG. 25 is a block diagram showing a method for determining a crane status, according to an embodiment.

FIG. 25 is a block diagram showing a method S800 of determining a crane status, according an embodiment. The method includes, generally, at S810, capturing an image along a length of an elongated crane component, such as a boom or mast. At S820, the method includes detecting one or more objects in the captured image. At S830, the method includes analyzing the captured image and/or the one or more detected object to determine one or more parameters within the captured image. In one embodiment, as shown at S910, the method may include determining a crane status based on the one or more determined parameters within the captured image. In one embodiment, the method includes, at S840, analyzing the captured image and/or one or more detected objects within the captured image, for example, based on the determined parameters within the captured image. In one embodiment, the method, at S920, determines the crane status based on the analysis of the parameters in the captured image. In one embodiment, at S850, the method includes determining one or more of: actual parameters corresponding to parameters determined in the captured image and/or of the detected object or an identity of the detected object and at S930, determining the crane status based on the analysis of the determined parameters, for example, based on the actual parameter or the identity of the detected object. In one embodiment, an additional crane status maybe determined based on a previously determined crane status. The method S800 may be performed by the system 110, for example, in response to executing, with the processor, the program instructions stored in the memory.

In some embodiments, the system 110 may include one of the sensor assemblies 114, 414, 514 described above and determine a crane status based in part, on information from the sensor assembly. The system 110 may additionally include another one or more of the sensor assemblies 414, 514 to supplement, back up or verify any of the other sensor assemblies 114, 414, 514, or any known sensor assembly readily apparent to those having skill in the art, to determine the crane status.

In the embodiments above, various features from one embodiment may be implemented in, used together with, or replace other features in different embodiments as suitable. For example, various parameters or objects detected in one embodiment may be determined or detected in other embodiments even if not expressly described as such. In addition, in some embodiments, some of the steps described above may be combined or optionally omitted. For example, a step of determining one or more parameters in a captured image may be combined with a step of analyzing the captured image.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A crane comprising:
   a lower works having one or more ground engaging elements;
   an upper works connected to the lower works, the upper works having a boom; and
   a system for determining a crane status, the system comprising:
   a sensor assembly positioned to have a line of sight along at least a portion of a length of the boom, the sensor assembly configured to detect light transmission and output sensor information, wherein the sensor assembly comprises a transmitter positioned on the boom and configured to emit a laser beam, and a receiver positioned on the boom and having an array of photosensors configured to detect the laser beam, such that the laser beam moves with respect to the receiver vertically as the boom deflects vertically, and the laser beam moves with respect to the receiver horizontally as the boom deflects horizontally, and wherein the sensor information includes information regarding detection of the laser beam by a photosensor of the array of photosensors and information regarding the photosensor detecting the laser beam; and
   a computer configured to receive the sensor information and determine the crane status based on the sensor information, wherein the computer determines a position of the laser beam on the receiver based on the sensor information,
   wherein the determined crane status includes vertical boom deflection and side boom deflection.

2. The crane of claim 1, wherein the transmitter emits a plurality of laser beams in a vertical plane.

3. The crane of claim 1, wherein the transmitter further comprises a diffraction device configured to diffract the laser beam into one or more beams in a vertical or horizontal plane.

4. The crane of claim 1, wherein the transmitter is rotatably mounted on the boom for movement through a range of angles in a vertical plane.

5. The crane of claim 4, wherein an angular position of the transmitter may be varied by a motor.

6. The crane of claim 5, wherein the motor is operably coupled to the computer and is configured to vary the angular position of the transmitter based on a predicted vertical deflection calculated by the computer.

7. The crane of claim 1, wherein the sensor assembly is positioned on a lateral side of the boom, an underside of the boom, a top side of the boom, on the lower works having a field of view along the underside of the boom, or on a tower crane mast.

8. The crane of claim 1, wherein the system for determining the crane status is operably connected to one or more crane components, and operation of the one or more crane components is controlled based on the determined crane status.

9. The crane of claim 1, wherein the determined crane status further includes at least one of: number of boom sections, type of boom sections, boom tip position, boom attachment installation condition and position, boom attachment offset, reeving configuration, optimal reeving configuration, retaining pin installation status, sheave rotation, boom pick point, flexible member condition, correct positioning of crane components, number of falls, number of flexible members, differences in construction from desired or expected construction, trolley position, tower crane mast twist, boom twist, trailing boom monitoring, and jib rigging mode.

10. A method for determining a crane status of a crane comprising a boom having a boom tip and a lifting appliance suspended from the boom tip, the method comprising:
    capturing an image along a length of the crane boom;
    detecting the boom tip of the crane boom in the captured image;
    analyzing the detected boom tip to determine a distance of the boom tip from a reference point within the captured image;
    analyzing the captured image based on the distance of the boom tip from the reference point within the captured image to determine one or more of: an actual vertical deflection of the crane boom and an actual horizontal deflection of the crane boom; and
    determining a position of the boom tip or a position of the lifting appliance based on one or more of the determined actual vertical deflection of the crane boom and the determined actual horizontal deflection of the crane boom.

11. The method of claim 10, further comprising: displaying, on a display device, the captured image.

12. The method of claim 10, further comprising:
    further analyzing the captured image to determine an additional crane status, wherein the determined additional crane statuses include one or more of: number of boom sections, type of boom sections, boom tip position, boom attachment installation condition and position, boom attachment offset, reeving configuration, optimal reeving configuration, retaining pin installation status, sheave rotation, boom pick point, flexible member condition, correct positioning of crane components, number of falls, number of flexible members, differences in construction from desired or expected construction, trolley position, tower crane mast twist, boom twist, trailing boom monitoring, and jib rigging mode.

13. A crane comprising:
    a lower works having one or more ground engaging elements;
    an upper works connected to the lower works, the upper works having a boom; and
    a system for determining a crane status, the system comprising:
    a sensor assembly positioned to have a line of sight along at least a portion of a length of the boom or the lower works, the sensor assembly configured to detect light transmission and output sensor information; and
    a computer configured to receive the sensor information and determine the crane status based on the sensor information,
    wherein the determined crane status includes at least one of: vertical boom deflection, side boom deflection, boom length, boom section length, number of boom sections, type of boom sections, boom tip position, boom attachment installation condition and position, boom attachment length, boom attachment offset, anti-two block (ATB) component status, ATB status of the crane, reeving configuration, optimal reeving configuration, retaining pin installation status, sheave rotation, boom pick point, flexible member condition, pendant rope length, correct positioning of crane components, number of falls, number of flexible members, differences in construction from desired or expected construction, trolley position, tower crane mast twist, boom twist, lift appliance sway, trailing boom monitoring, jib rigging mode, and flexible member speed, wherein the sensor assembly comprises a transmitter configured to emit a laser beam and a receiver having an array of photosensors configured to detect the laser beam, wherein the transmitter is rotatably mounted on the boom for movement through a range of angles in a vertical plane, wherein an angular position of the transmitter may be varied by a motor, and wherein the motor is operably coupled to the computer and is configured to vary the angular position of the transmitter based on a predicted vertical deflection calculated by the computer.

* * * * *